United States Patent
Botelho

(10) Patent No.: US 11,237,864 B2
(45) Date of Patent: Feb. 1, 2022

(54) DISTRIBUTED JOB SCHEDULER WITH JOB STEALING

(71) Applicant: RUBRIK, INC., Palo Alto, CA (US)

(72) Inventor: Fabiano Botelho, San Ramon, CA (US)

(73) Assignee: Rubrik, Inc., Palo Alto, CA (US)

( * ) Notice: Subject to any disclaimer, the term of this patent is extended or adjusted under 35 U.S.C. 154(b) by 265 days.

(21) Appl. No.: 15/890,325

(22) Filed: Feb. 6, 2018

(65) Prior Publication Data
US 2019/0243683 A1    Aug. 8, 2019

(51) Int. Cl.
| | | |
|---|---|---|
| G06F 9/48 | (2006.01) | |
| G06F 21/57 | (2013.01) | |
| G06F 21/44 | (2013.01) | |
| G06F 9/455 | (2018.01) | |

(52) U.S. Cl.
CPC ............ *G06F 9/4881* (2013.01); *G06F 21/44* (2013.01); *G06F 21/57* (2013.01); *G06F 9/45533* (2013.01)

(58) Field of Classification Search
None
See application file for complete search history.

(56) References Cited

U.S. PATENT DOCUMENTS

| | | | | |
|---|---|---|---|---|
| 2004/0054999 | A1* | 3/2004 | Willen | G06F 9/5044 718/103 |
| 2014/0244980 | A1* | 8/2014 | Mortazavi | G06F 11/30 712/220 |
| 2016/0378565 | A1* | 12/2016 | Che | G06F 9/3887 718/105 |
| 2017/0048352 | A1* | 2/2017 | Imamura | G06F 16/182 |

OTHER PUBLICATIONS

Imam et al., Load Balancing Prioritized asks via Work-Stealing, European Conference on Parallel Processing, Euro-Par2015: Parallel Processing, pp. 222-234 (Year: 2015).*

* cited by examiner

*Primary Examiner* — Lewis A Bullock, Jr.
*Assistant Examiner* — Melissa A Headly
(74) *Attorney, Agent, or Firm* — Schwegman Lundberg & Woessner, P.A.

(57) ABSTRACT

Methods and systems for improving the performance of a distributed job scheduler using job self-scheduling and job stealing are described. The distributed job scheduler may schedule jobs to be run among data storage nodes within a cluster. Each node in the cluster may make a localized decision regarding which jobs should be executed by the node by periodically polling candidate jobs from a table of candidate jobs stored using a distributed metadata store. Upon completion of a job, the job may self-schedule another instance of itself if the next instance of the job should be run before the next polling of candidate jobs by the node that ran the completed job. The node may attempt to steal one or more jobs from a second node within the cluster if a job queue length for a job queue associated with the node falls below a queue length threshold.

16 Claims, 22 Drawing Sheets

```
Virtual Machine A, Version V7 {
    pBase,      ⟶  /snapshots/VM_A/s5/s5.full
    pF1,        ⟶  /snapshots/VM_A/s6/s6.delta
    pF2         ⟶  /snapshots/VM_A/s7/s7.delta
}
```

```
Virtual Machine A, Version V2 {
    pBase,      ⟶  /snapshots/VM_A/s5/s5.full
    pR1,        ⟶  /snapshots/VM_A/s4/s4.delta
    pR2,        ⟶  /snapshots/VM_A/s3/s3.delta
    pR3         ⟶  /snapshots/VM_A/s2/s2.delta
}
```

```
Virtual Machine A, Version V7 {
    pBase2,              ⟶  /snapshots/VM_A/s7/s7.full
}
```

```
Virtual Machine A, Version V2 {
    pBase2,              ⟶  /snapshots/VM_A/s7/s7.full
    pR11,                ⟶  /snapshots/VM_A/s6/s6.delta
    pR12,                ⟶  /snapshots/VM_A/s5/s5.delta
    pR1,                 ⟶  /snapshots/VM_A/s4/s4.delta
    pR2,                 ⟶  /snapshots/VM_A/s3/s3.delta
    pR3                  ⟶  /snapshots/VM_A/s2/s2.delta
}
```

```
Virtual Machine B, Version V1 {
    pBase,
    pR1,
    pR2,
    pF3
}
```

```
Virtual Machine C, Version V2 {
    pBase,
    pF1,
    pF5,
    pF6
}
```

```
Virtual Machine B, Version V1 {
    pBase2,
    pR11,
    pR12,
    pR1,
    pR2,
    pF3
}
```

```
Virtual Machine C, Version V2 {
    pBase2,
    pR11,
    pF5,
    pF6
}
```

Virtual Machine A, Version VS {
    pBaseA,
    pR4,
}

Virtual Machine A, Version VU {
    pBaseB,
    pR1,
    pR2,
    pR3
}

```
Virtual Machine A, Version VU {
    pBaseA,
    pF9
}
```

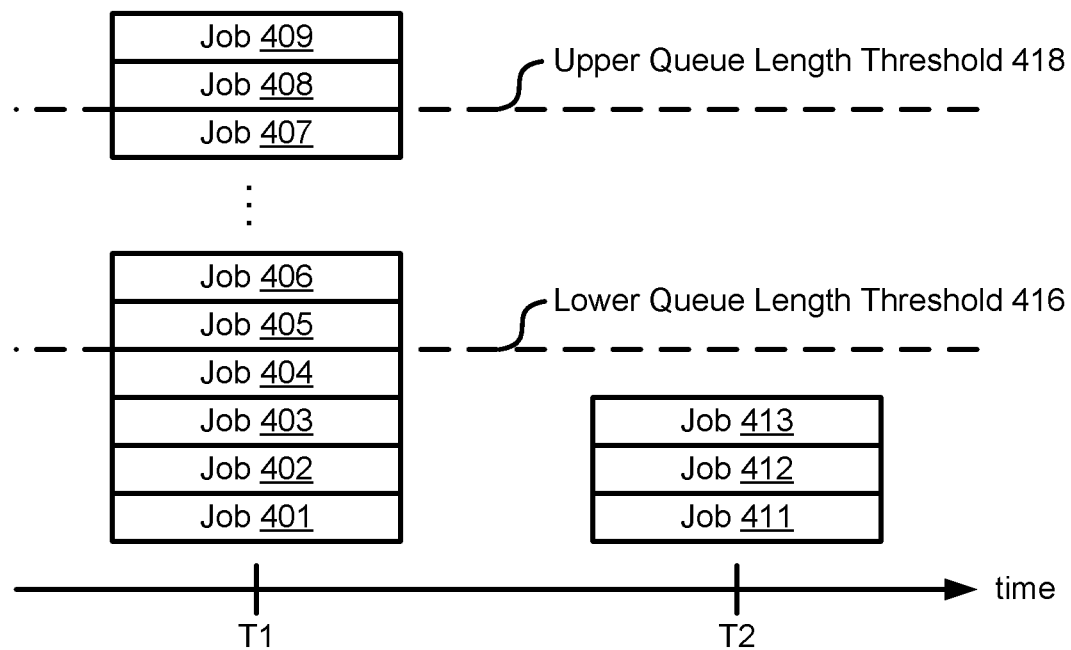
FIG. 4A
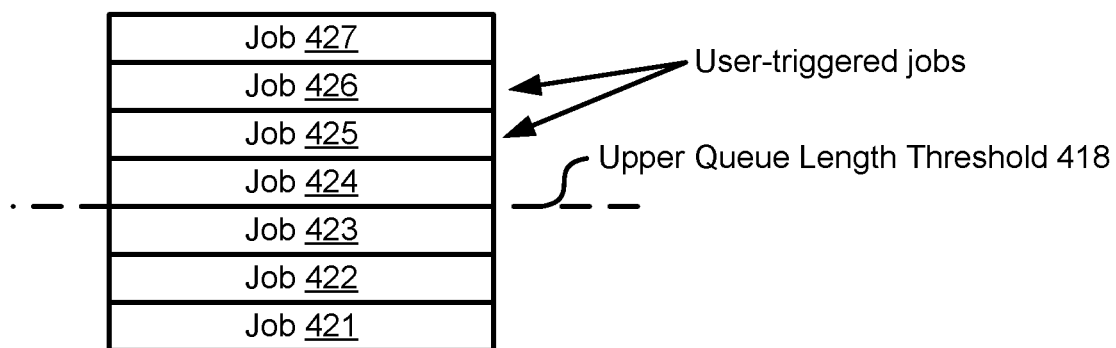
FIG. 4B
| Node ID | Job Queue Length | Avg. Queue Length | Time |
|---|---|---|---|
| Node1 | 20 | 18 | 08:43 |
| Node3 | 18 | 17 | 08:30 |
| Node4 | 12 | 14 | 08:30 |
| Node7 | 16 | 16 | 08:40 |
FIG. 4C

DISTRIBUTED JOB SCHEDULER WITH JOB STEALING

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

BRIEF DESCRIPTION OF THE DRAWINGS

FIG. 4A depicts one embodiment of a job queue associated with a first node of a plurality of nodes at two different points in time.

FIG. 4B depicts one embodiment of a job queue associated with a second node of a plurality of nodes.

FIG. 4C depicts one embodiment of a job queue lengths table for storing job queue length information for various nodes within a cluster of data storage nodes.

DETAILED DESCRIPTION

Figure 1A:
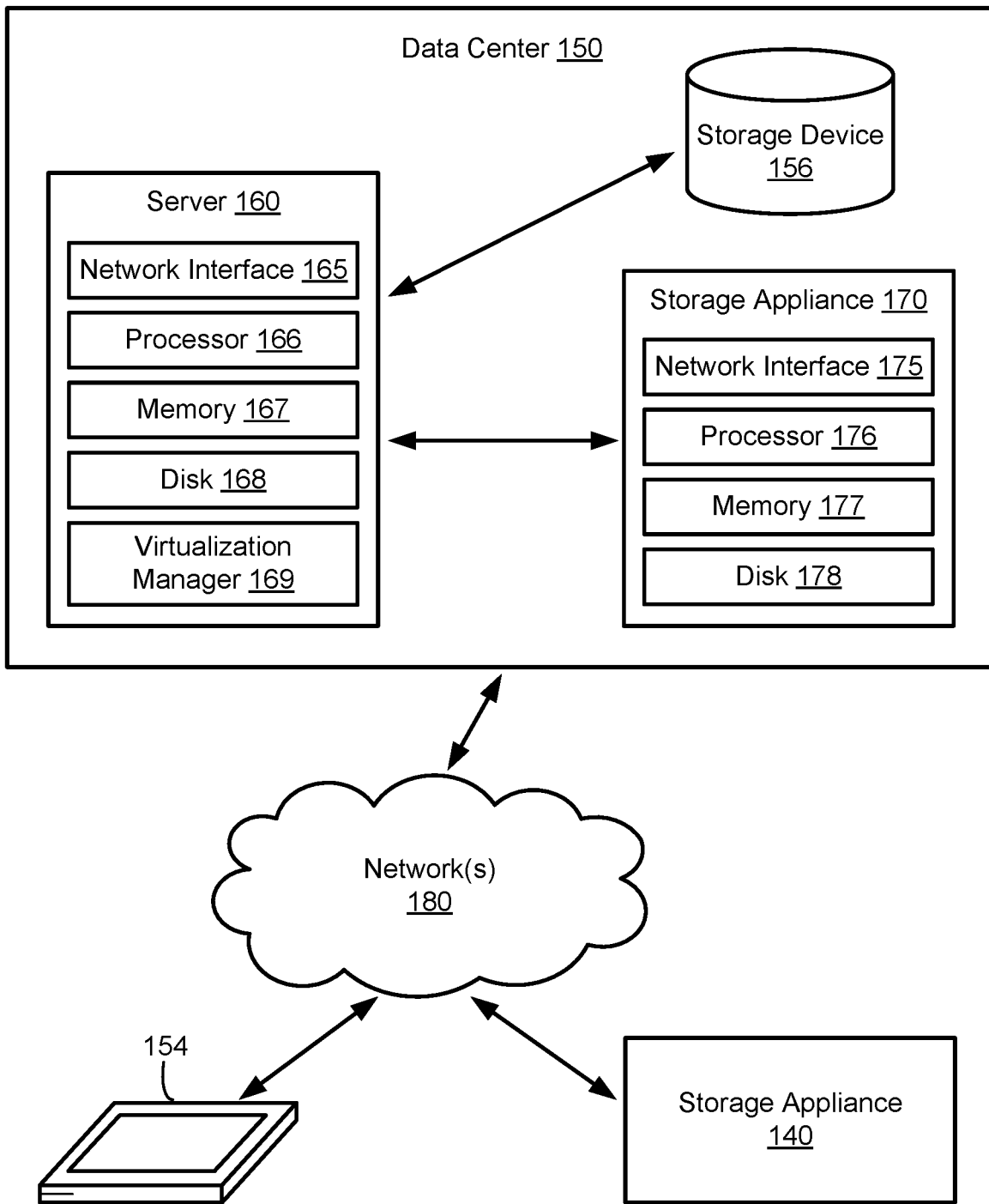
FIG. 1A depicts one embodiment of a networked computing environment.

Technology is described for improving the real-time performance of a distributed job scheduler by reducing polling delay via job self-scheduling and improving load balancing via job stealing. The distributed job scheduler may schedule jobs to be run using a cluster of data storage nodes (e.g., the jobs may be executed among eight data storage nodes within the cluster). Each node in the cluster may make a localized decision regarding which jobs should be executed by the node by polling candidate jobs (e.g., periodically polling the candidate jobs every five minutes) from a distributed metadata store or from a table of candidate jobs stored using the distributed metadata store. The jobs executed by a data storage node in the cluster may include snapshot jobs to acquire and store virtual machine snapshots for one or more virtual machines over time and garbage collection jobs to free-up disk storage space within the cluster. After a job running on the data storage node has completed its tasks, a determination may be made as to whether the job comprises one of a recurring sequence of jobs for performing a periodic task (e.g., backing up a database every 15 minutes).

In some cases, a job may self-schedule another instance of itself (e.g., schedule a second job for performing the same tasks as the completed job) without involving the job scheduler if there is less than a threshold amount of time (e.g., less than five minutes) before the next instance of the job should be executed. In one example, a backup schedule or a service level agreement (SLA) policy may be used to determine when the next instance of the job should be run and the amount of time remaining before the next instance of the job should be run may be compared with the threshold amount of time. In other cases, a job may self-schedule another instance of itself if the next instance of the job should be run before the next polling of candidate jobs by the data storage node that ran the job; in this case, the next instance of the job should be run before the next polling cycle. For example, the next instance of the job may need to be run within five minutes while the next polling of candidate jobs may be in ten minutes. The job may self-schedule another instance of itself by directly adding a second job to a job queue for the data storage node before the next polling of candidate jobs by the data storage node. The job may also write an entry for the second job to a table of candidate jobs for the cluster specifying that the second job has been assigned to the job queue for the data storage node. The table of candidate jobs may be stored using a distributed metadata store to protect against node failures. In some cases, a completed job may send the next instance of the job to a set of candidate nodes that are eligible to run the next instance of the job such that the next instance of the job gets added to their in-memory run-queues immediately or prior to the next polling cycle. One benefit of enabling a job to self-schedule another instance of itself is that the polling delay caused by the periodic polling frequency of the nodes may be reduced. Furthermore, the distributed job scheduler may be more responsive to user-triggered actions, such as live mounts and file downloads, that require minimal delay in execution.

The load balancing of jobs running within a cluster of data storage nodes may be performed via job stealing. In some embodiments, a first node within the cluster of data storage nodes may attempt to steal one or more jobs from a second node within the cluster of data storage nodes if a job queue length for a job queue associated with the first node falls below a lower queue length threshold (e.g., the job queue for the first node has less than four jobs within the job queue). The identification of the second node from which to steal or transfer a particular job assigned to a job queue for the second node may comprise randomly selecting the second node from among the data storage nodes within the cluster, identifying the second node at random (e.g., via a random number generator) among a set of data storage nodes within the cluster that have job queue lengths greater than an upper queue length threshold, or identifying the second node based on a ranking of the job queue lengths for multiple nodes within the cluster of data storage nodes. The second node may be identified as the node within the cluster with the highest job queue length or the highest average job queue length over a threshold period of time (e.g., over the past ten minutes).

The job queue lengths for the multiple nodes within the cluster of data storage nodes may be acquired from a table that is updated periodically with the job queue lengths for the multiple nodes within the cluster. The table of job queue lengths may be stored using a distributed metadata store. The table of job queue lengths may be updated or written to when a node within the cluster becomes overloaded, has a job queue length greater than a queue length threshold (e.g., greater than an upper queue length threshold), or has a job queue that stores more than a threshold number of jobs to be executed (e.g., has more than twenty jobs to be executed). The table of job queue lengths may also store time stamp information for when each job queue length entry was made.

In some cases, priority may be given to stealing or transferring user-triggered jobs or on-demand jobs before stealing other types of jobs, which may help to give priority to user driven operations and to minimize the delay in executing the user driven operations. In one embodiment, the second node from which the first node may steal one or more jobs may be identified as the node within the cluster of data storage nodes with the greatest number of user-triggered jobs above a queue position associated with a queue length threshold. In one example, the second node may have three user-triggered jobs that are in a queue position above the tenth queue slot in the job queue; in this case, at least ten jobs will need to be executed before the three user-triggered jobs are executed. In some cases, the number of jobs that are stolen or transferred from the second node to the first node may depend on the number of jobs within the job queue for the second node above an upper queue length threshold and/or the number of jobs within the job queue for the first node below a lower queue length threshold. In other cases, the number of jobs transferred from the second node to the first node may comprise all the jobs within the job queue for the second node above a queue length threshold (e.g., all the jobs that are in a queue position above the tenth queue position).

In some embodiments, a distributed job scheduler may assign a particular job to be run on three randomly selected nodes within a cluster of data storage nodes (e.g., the particular job may be run on three out of eight data storage nodes) and write entries for the particular job to job queues for the three selected nodes. The particular job may be stolen or transferred from one of the three randomly selected nodes to a fourth node within the cluster of data storage nodes if the fourth node has a job queue with fewer than a threshold number of jobs within the job queue. In one embodiment, the fourth node may detect that the job queue length for the job queue associated with the fourth node is less than a lower queue length threshold (e.g., the job queue for the fourth node may store fewer than four jobs to be run on the fourth node). In some cases, in response to detecting that the job queue length is less than the lower queue length threshold, the fourth node may randomly select one of the three nodes running the particular job and steal the particular job from the randomly selected node. In other cases, in response to detecting that the job queue length is less than the lower queue length threshold, the fourth node may acquire a table of job queue lengths (e.g., stored using a distributed metadata store) that stores job queue lengths for multiple nodes within the cluster of data storage nodes and identify one of the three nodes for which the particular job has been queued based on the job queue lengths for the three nodes. The fourth node may steal the particular job from the node of the three nodes with the largest job queue length.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
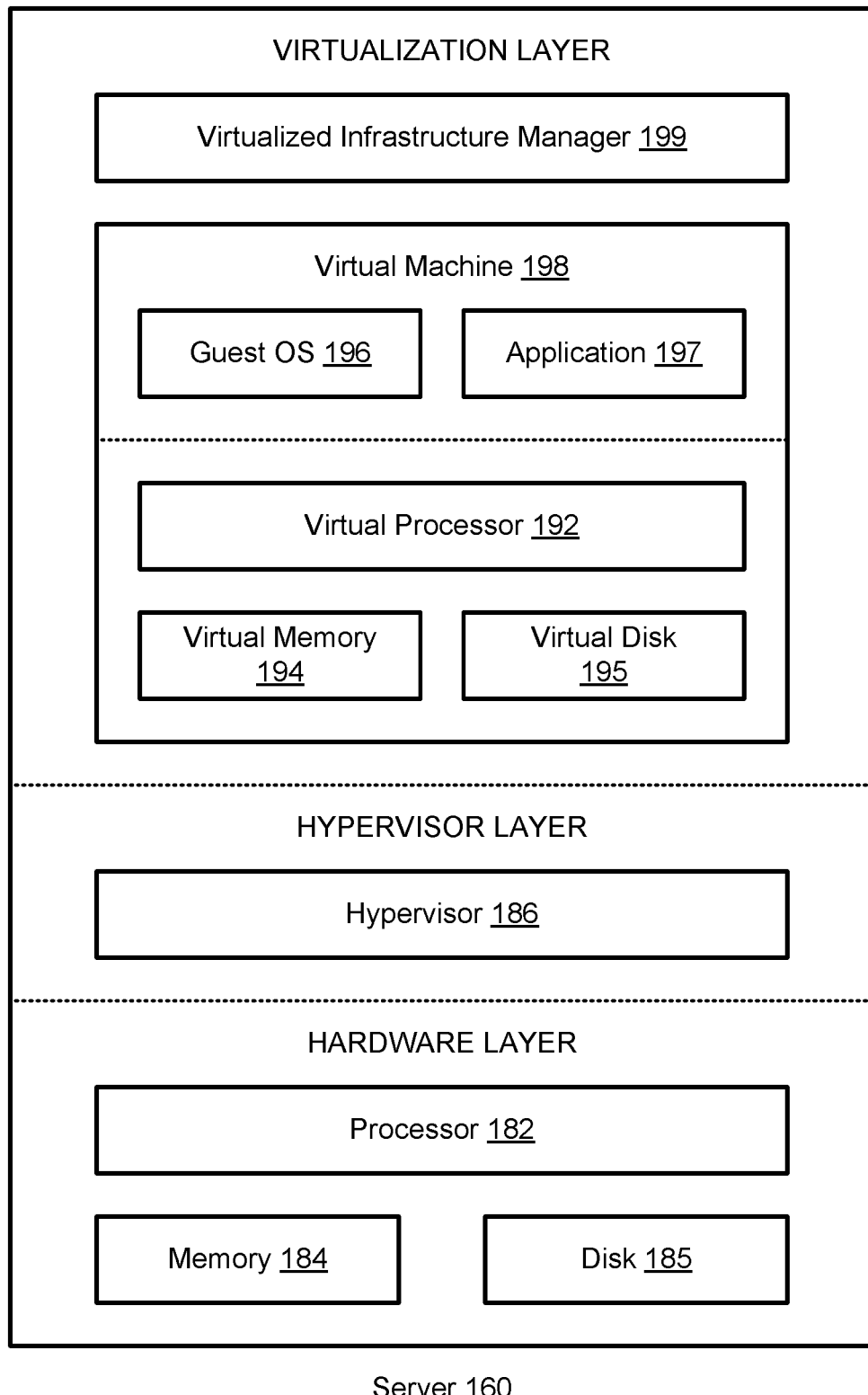
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
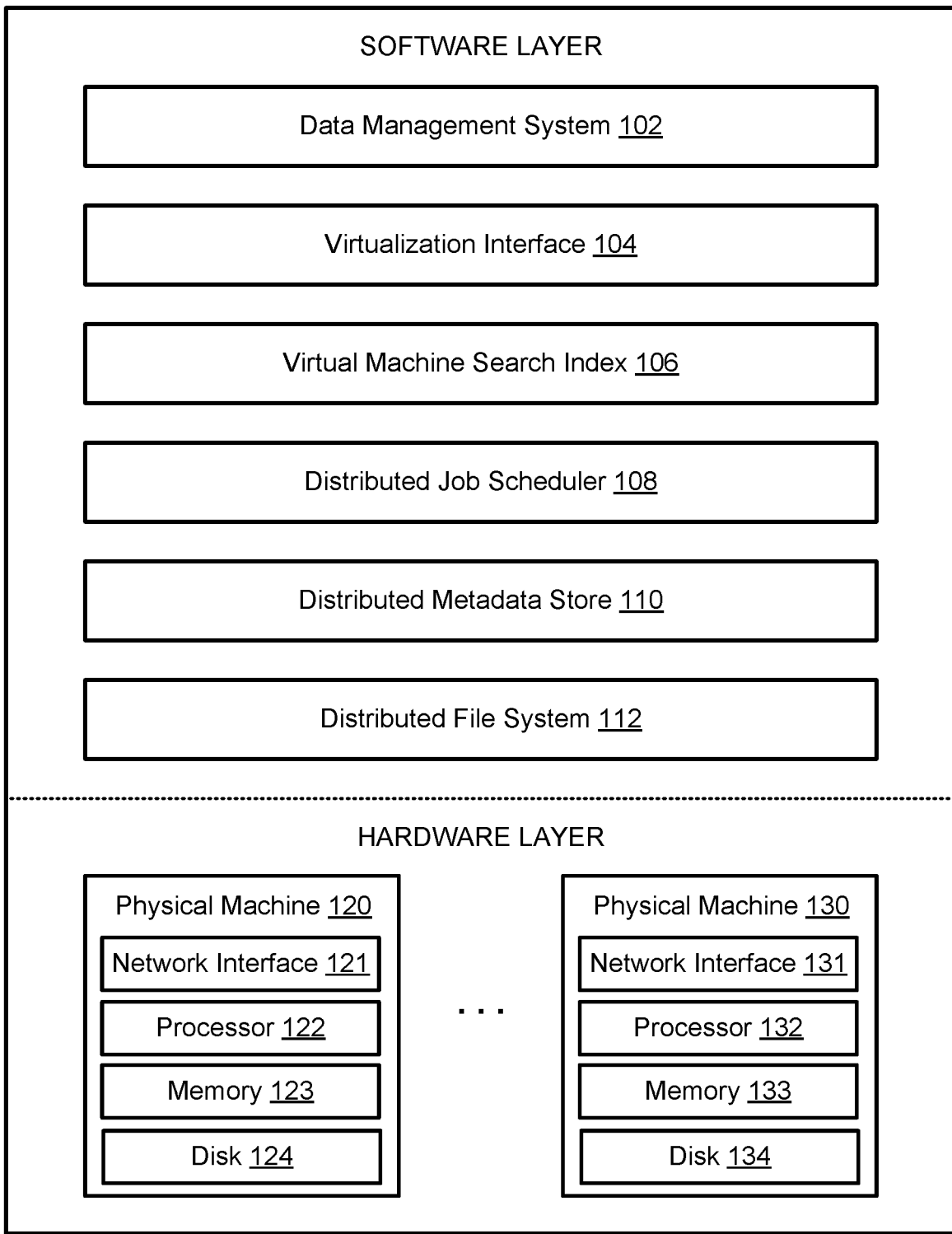
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/ and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a SSD or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
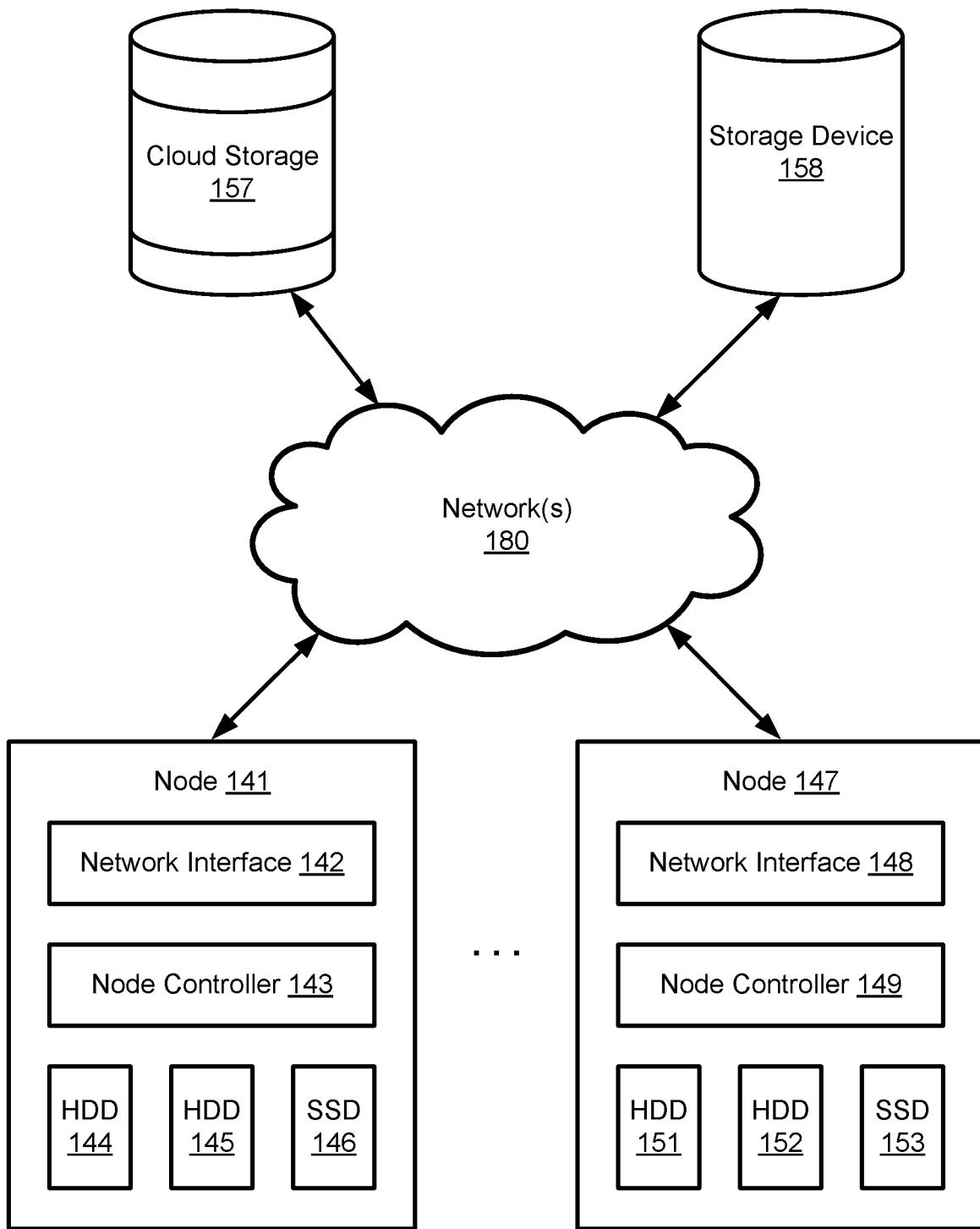
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

Figures 2A, 2B, 2C:
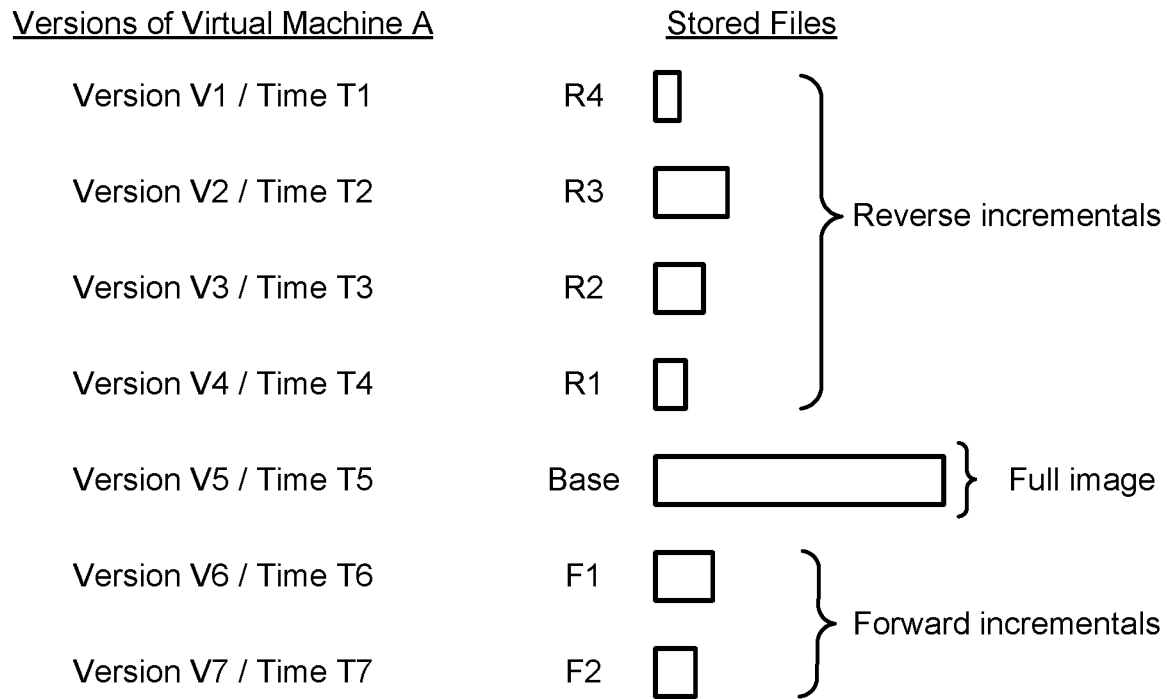
FIGS. 2A-2Q depict various embodiments of sets of files and data structures associated with managing and storing snapshots of virtual machines.
Figures 2D, 2E, 2F:
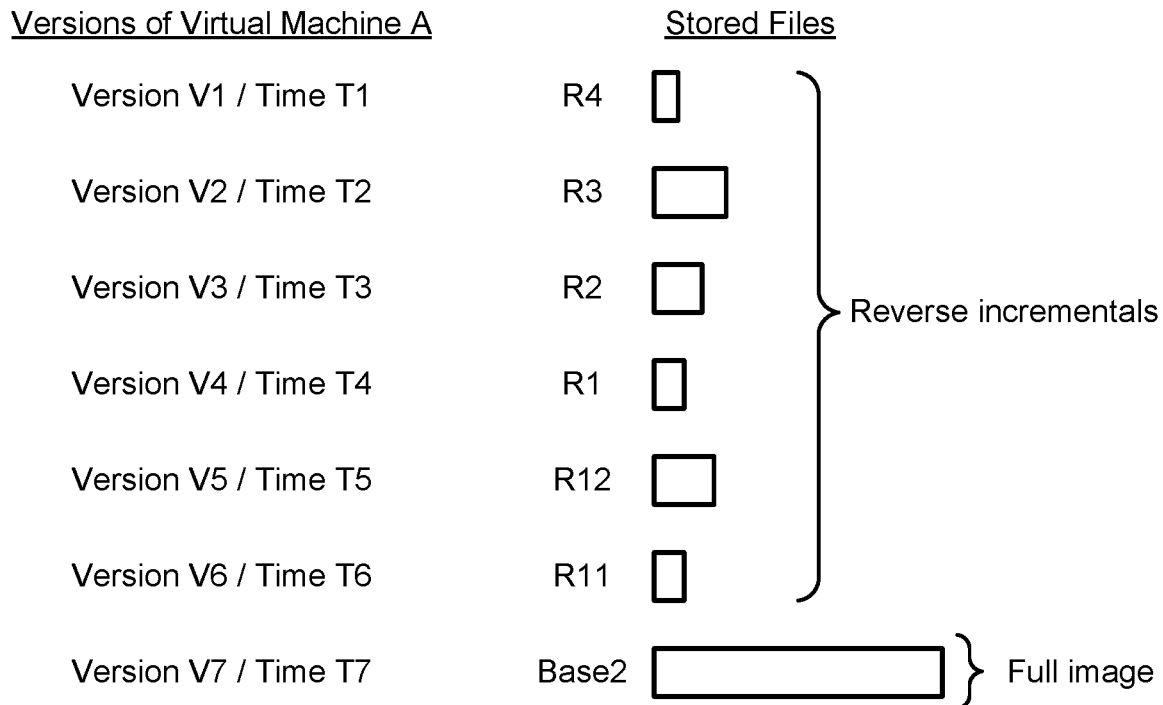
Figures 2G, 2H, 2I:
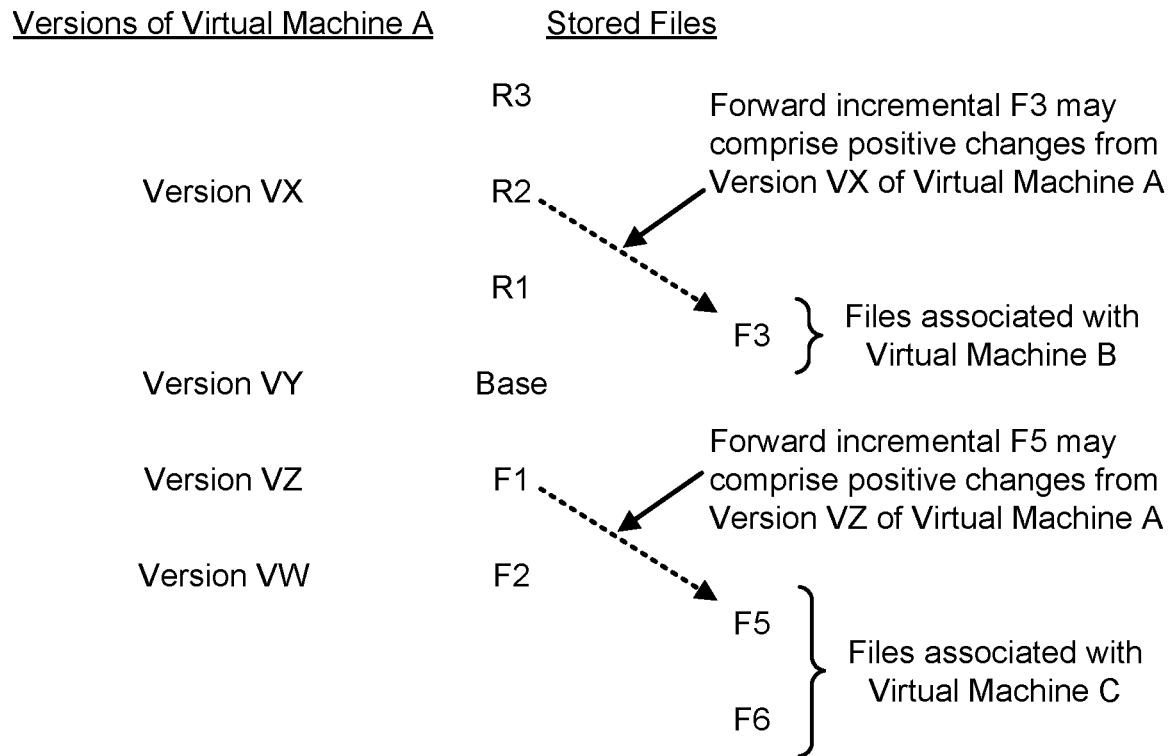
Figures 2J, 2K, 2L:
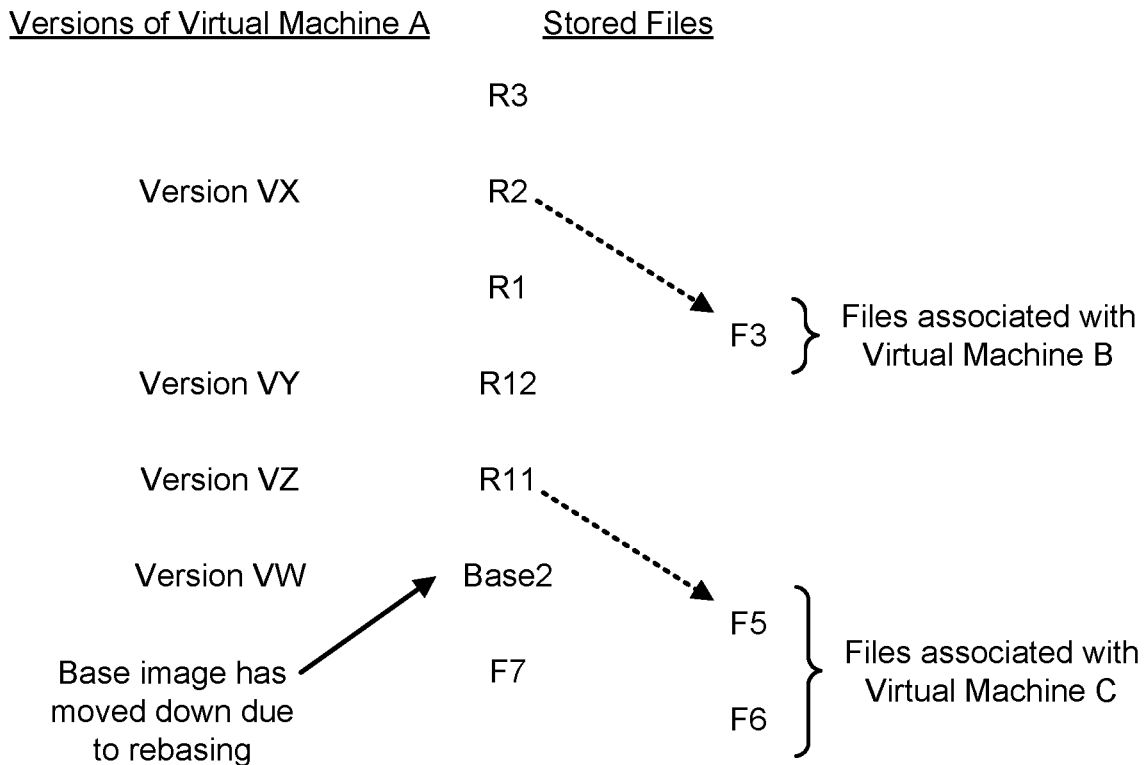
Figures 2M, 2N, 2O:
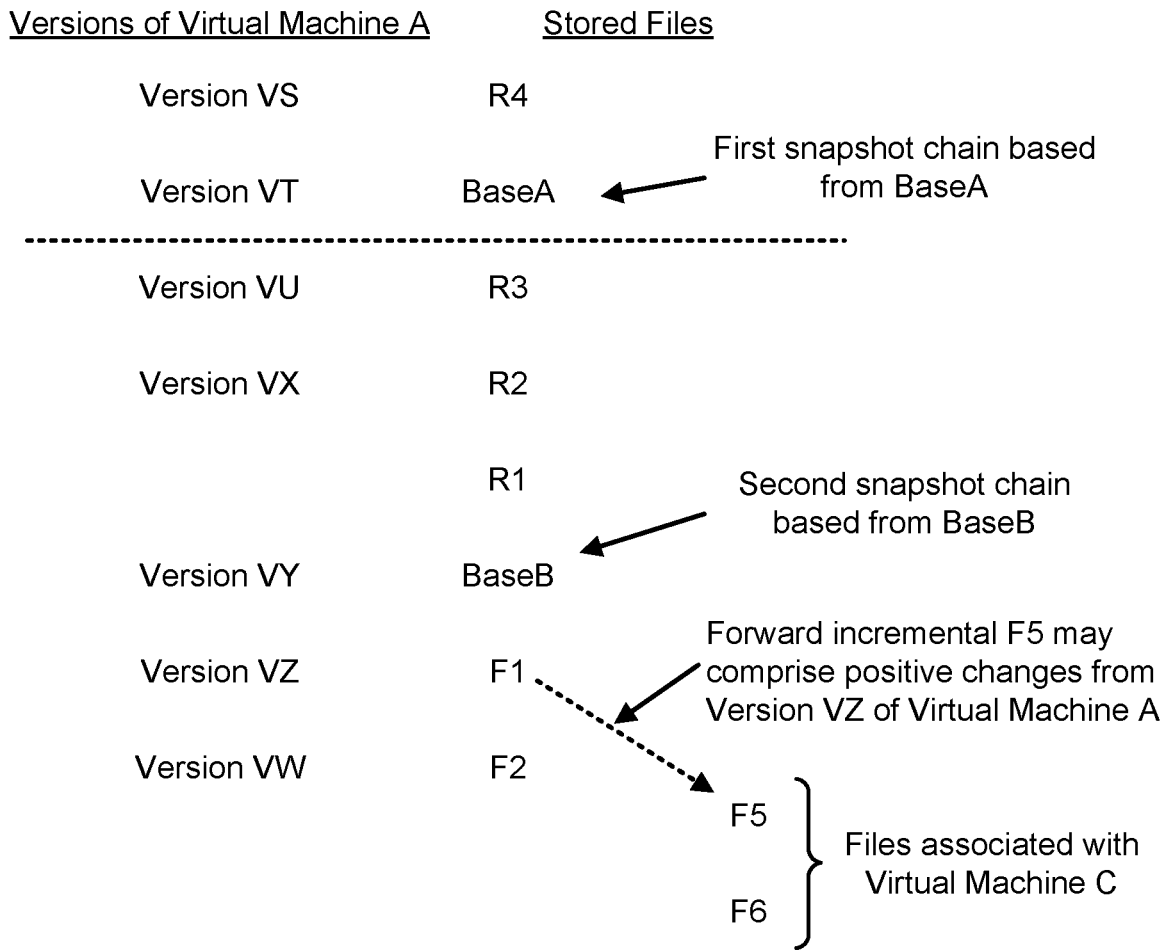
Figures 2P, 2Q:
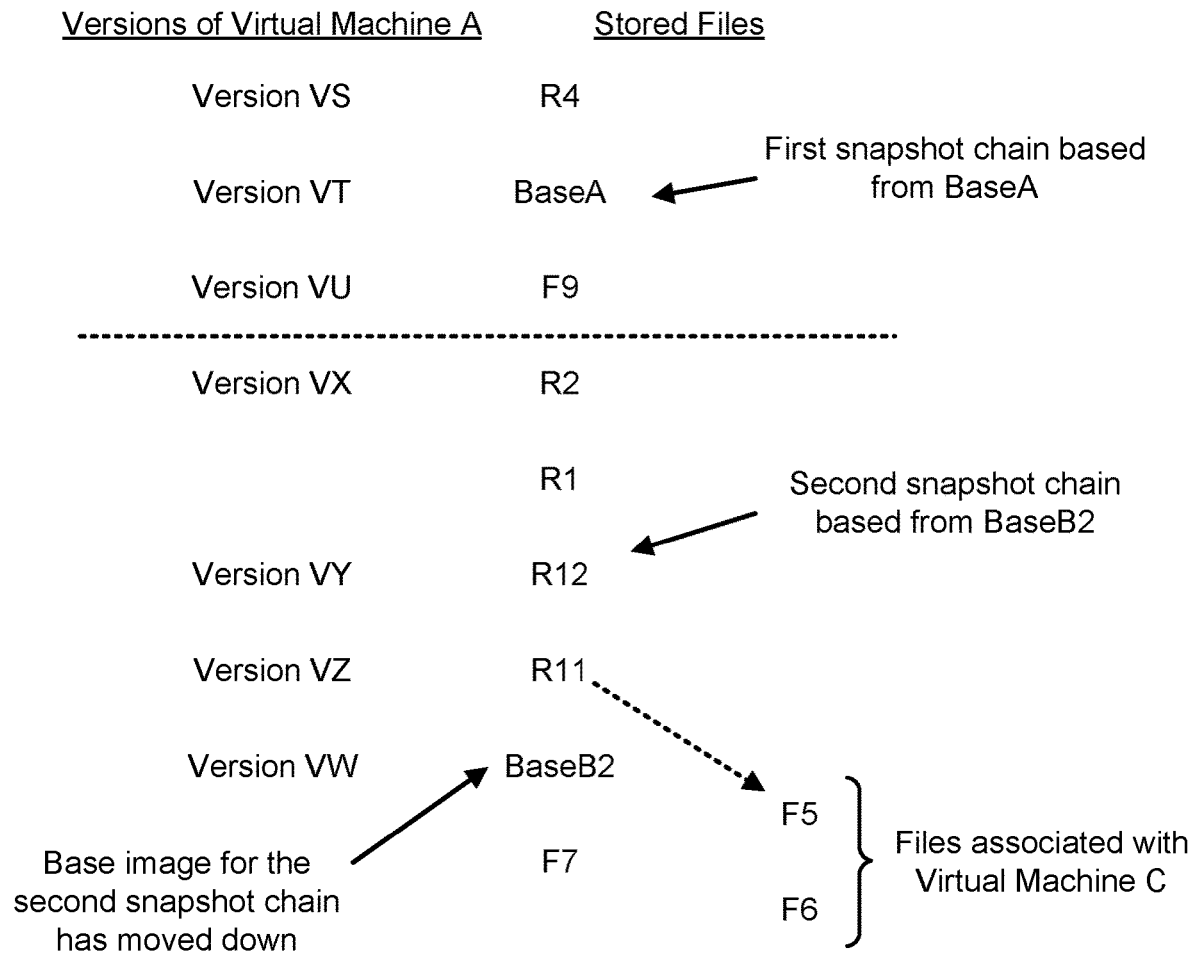

FIGS. 2A-2Q depict various embodiments of sets of files and data structures (e.g., implemented using merged files) associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6. The forward incremental F1 may include one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path/snapshots/VM_A/s6/s6.delta), and a third pointer (pF2) that references the forward incremental F2 (e.g., via the path/snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path/snapshots/VM_A/s4/s4.delta), a third pointer (pR2) that references the reverse incremental R2 (e.g., via the path/snapshots/VM_A/s3/s3.delta), and a fourth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path/snapshots/VM_A/s6/s6.delta), a third pointer (pR12) that references the reverse incremental R12 (e.g., via the path/snapshots/VM_A/s5/s5.delta), a fourth pointer (pR1) that references the reverse incremental R1 (e.g., via the path/snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment. In some cases, a server within the production environment may boot up a failed virtual machine directly from a storage appliance, such as storage appliance 170 in FIG. 1C, acting as an NFS datastore to minimize the recovery time to recover the failed virtual machine.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

FIG. 2J depicts one embodiment of a set of files associated with multiple virtual machine snapshots after a rebasing process has been performed using the set of files in FIG. 2G. The set of files may be stored using a distributed file system, such as distributed file system 112 in FIG. 1C. The rebasing process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some cases, a backed-up version of a first virtual machine may be generated by concurrently reading a full image of a second virtual machine different from the first virtual machine from a first storage device (e.g., a HDD) while reading one or more incrementals associated with the first virtual machine from a second storage device (e.g., an SSD) different from the first storage device.

FIG. 2M depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB), the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2N depicts one embodiment of a merged file for generating version VS of Virtual Machine A using the set of files depicted in FIG. 2M. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2O depicts one embodiment of a merged file for generating version VU of Virtual Machine A using the set of files depicted in FIG. 2M. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

FIG. 2P depicts one embodiment of a set of files associated with multiple virtual machine snapshots after a rebasing process has been performed to a snapshot chain using the set of files in FIG. 2M. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2Q depicts one embodiment of a merged file for generating version VU of Virtual Machine A using the set of files depicted in FIG. 2P. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2P) may have its chain length extended or snapshots previously assigned to the second snapshot chain may be moved to the existing snapshot chain. For example, the first snapshot chain depicted in FIG. 2M comprises two total snapshots, while the first snapshot chain depicted in FIG. 2P comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

In some embodiments, the maximum incremental chain length, the maximum reverse incremental chain length, or the maximum forward incremental chain length for a snapshot chain may be adjusted over time as nodes or disks are added to or removed from a cluster or upon an update to a data backup and archiving schedule for a virtual machine due to the assignment of a new backup class or a new backup, replication, and archival policy. In one example, the maximum incremental chain length may be increased from 200 incrementals to 500 incrementals if the number of nodes or disks falls below a threshold number (e.g., is less than four nodes). In another example, the maximum incremental chain length may be increased from 100 incrementals to 200 incrementals if the available disk storage falls below a threshold amount if disk space (e.g., the amount of available disk space is less than 20 TB).

Figure 3A:
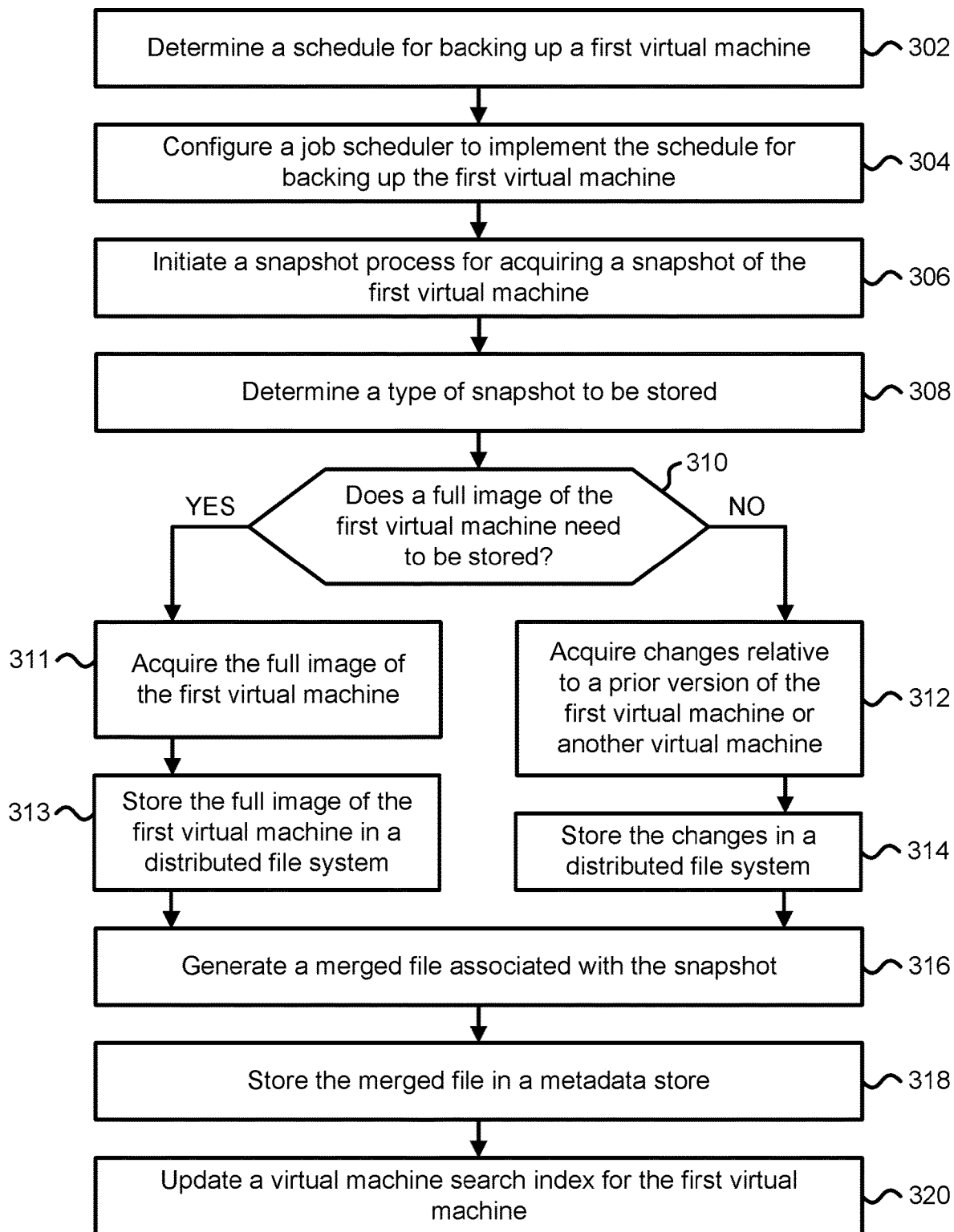
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operation system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
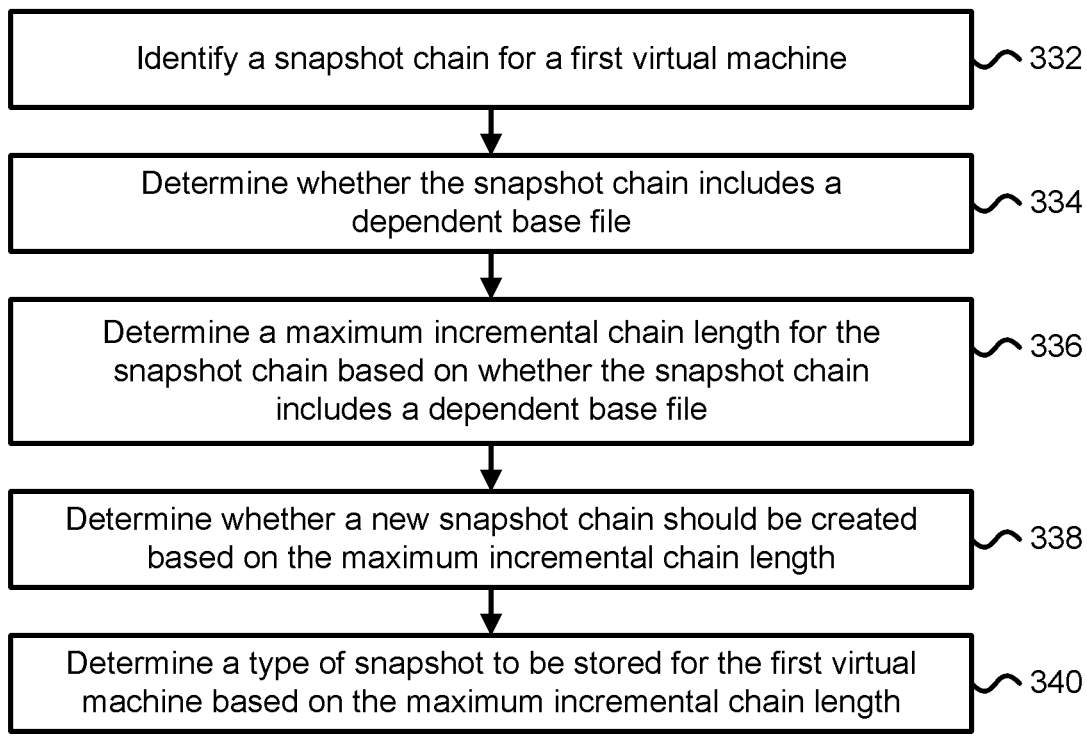
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive. One example of backed-up versions of a virtual machine being stored using one or more snapshot chains is depicted in FIG. 2P in which the versions of Virtual Machine A are stored using a first snapshot chain anchored by full image BaseA and a second snapshot chain anchored by full image BaseB2.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

Figure 3C:
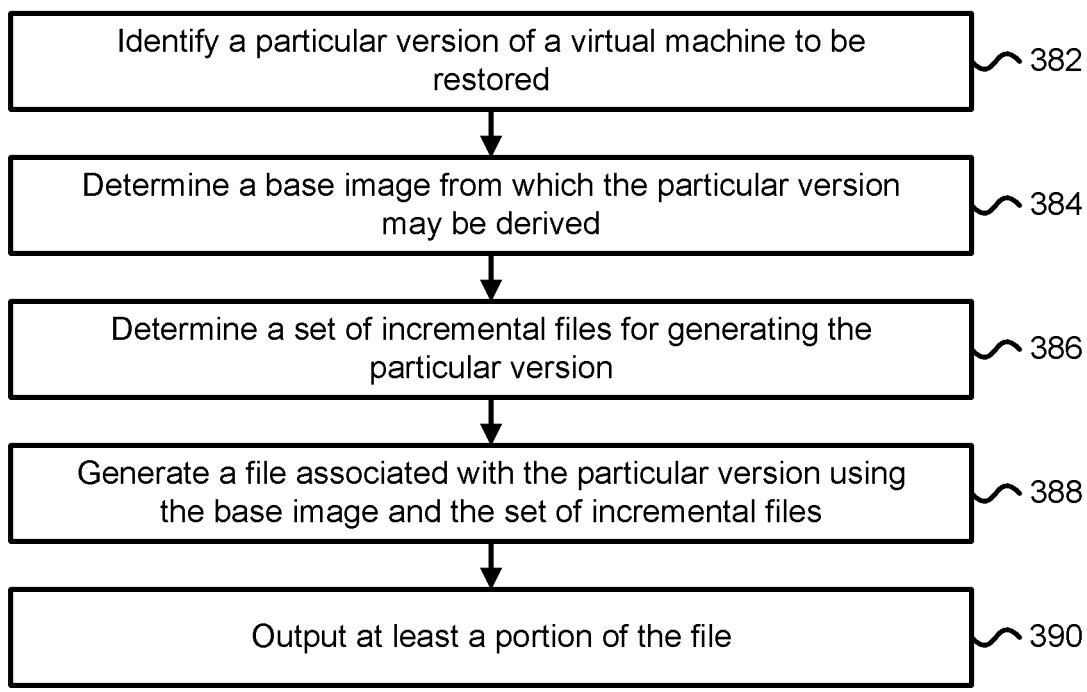
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 388, a file associated with the particular version is generated using the base image and the set of incremental files. The file may be generated by patching the set of incremental files onto the base image.

In one example, referring to FIG. 2G, if the particular version corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine. Data deduplication techniques may be applied to identify a candidate base image from which a dependent base file may depend and to generate the dependent base file.

FIG. 4A depicts one embodiment of a job queue associated with a first node of a plurality of nodes at two different points in time. The job queue may comprise a FIFO and be implemented using a memory, such as an SRAM or a DRAM. The plurality of nodes may comprise a cluster of data storage nodes, such as the data storage nodes 141-147 depicted in FIG. 1D. As depicted, the job queue associated with the first node at time T1 includes entries for jobs 401-409 in which job 401 may comprise the next job to be run on the first node (e.g., the job 401 may comprise the job at the head of the job queue) followed by job 402 followed by job 403; job 409 comprises the last job at the back of the job queue at time T1. Jobs 401-404 may reside below a lower queue length threshold 416 (e.g., set to four jobs). Jobs 405-407 may reside between the lower queue length threshold 416 and an upper queue length threshold 418 (e.g., set to seven or ten jobs). Jobs 408-409 may reside above the upper queue length threshold 418. In one embodiment, if the number of jobs within the job queue associated with the first node exceeds the upper queue length threshold 418, then the first node may publish or write its job queue length to a table of job queue lengths. In this case, when the job queue for the first node is overloaded with jobs to run or the job queue length for the job queue is greater than the upper queue length threshold 418, the first node may write to the table of job queue lengths indicating the job queue length for the job queue and a time (or timestamp) at which the table was written with the job queue length for the job queue. The job queue length for the job queue at time T1 may correspond with the nine queued jobs 401-409 to be executed using the first node. The table of job queue lengths may be stored using a distributed metadata store, such as the distributed metadata store 110 in FIG. 1C, and may be read and/or written by any of the plurality of nodes. The table of job queue lengths may comprise a metadata table for storing job queue lengths and/or average job queue lengths for multiple nodes in a cluster of data storage nodes.

As depicted in FIG. 4A, the job queue associated with the first node at time T2 stores entries for jobs 411-413 in which job 411 may comprise the next job to be run on the first node followed by job 412 followed by job 413. The job queue length for the job queue at time T2 may correspond with the three queued jobs 411-413 to be executed using the first node. In this case, the job queue length for the job queue at time T2 is less than the lower queue length threshold 416. In one embodiment, if the number of job entries within the job queue associated with the first node is less than the lower queue length threshold 416, then the first node may attempt to steal jobs or take jobs from other nodes within the plurality of nodes.

In some cases, the upper queue length threshold 418 and the lower queue length threshold 416 may be fixed over time (e.g., set by an end user of an integrated data management and storage system). In other cases, the upper queue length threshold 418 and/or the lower queue length threshold 416 may vary over time based on the number of the plurality of nodes and/or the number of jobs queued for the plurality of nodes. In one example, an average number of jobs queued per node (e.g., corresponding with the average job queue length for the plurality of nodes over the past ten minutes) may be determined and the lower queue length threshold 416 may be set such that the lower queue length threshold 416 is a particular fraction of the average number of jobs queued per node (e.g., is half of the average number of jobs queued per node) or is particular number of jobs less than the average number of jobs queued per node (e.g., is set to five jobs less than the average number of jobs queued per node). In another example, the lower queue length threshold 416 may be set as a particular fraction of the average job queue length for the plurality of nodes over a particular period of time (e.g., one third of the average job queue length for the plurality of nodes over the past ten minutes).

The upper queue length threshold 418 may be set such that the upper queue length threshold 418 is a particular multiple of the average number of jobs queued per node (e.g., is two times the average number of jobs queued per node) or is particular number of jobs greater than the average number of jobs queued per node (e.g., is set to ten jobs greater than the average number of jobs queued per node). In some cases, a queue length threshold (e.g., the upper queue length threshold) may be determined by determining the job queue lengths associated with each node of the plurality of nodes, ranking the job queue lengths, and then setting the queue length threshold such that a particular percentage (e.g., 10% of the nodes) of the plurality of nodes have job queue lengths that are above (or below) the queue length threshold. The upper queue length threshold 418 and the lower queue length threshold 416 may be updated on a periodic basis (e.g., every ten minutes).

FIG. 4B depicts one embodiment of a job queue associated with a second node of a plurality of nodes. As depicted, the job queue associated with the second node has four jobs 424-427 that are positioned above the upper queue length threshold 418. Two jobs 425-426 out of the four jobs 424-427 may be identified as user-triggered jobs, user-driven jobs, or high priority on-demand jobs. A distributed job scheduler, such as the distributed job scheduler 108 in FIG. 1C, may identify a job as being triggered by an end user of a storage appliance or an integrated data management and storage system (e.g., in response to an end user of a user interface for the integrated data management and storage system requesting an on-demand snapshot for a virtual machine) or may identify the job as comprising a high priority job to be given priority over other jobs for execution. A listing of jobs to be given the higher priority status may be provided by the end user of the integrated data management and storage system.

In one embodiment, a first node of a plurality of nodes may identify a first job to be stolen out of the four jobs 424-427 assigned to the job queue for the second node based on a priority status for the first job and/or the position of the first job within the job queue for the second node. In one example, the first job to be stolen may comprise the job of the four jobs 424-427 that is the farthest back in the job queue (e.g., the last job added to the queue, such as job 427 in FIG. 4B) or the job of the four jobs 424-427 that has been assigned the highest priority status and is positioned farthest from the front of the job queue (e.g., job 426 in FIG. 4B). In some cases, the first node may steal one or more jobs from the second node. In one example, the first node may steal two user-triggered jobs or two jobs that have been assigned the higher priority status from the second node if two jobs with those attributes exist within the job queue for the second node above the upper queue length threshold 418.

FIG. 4C depicts one embodiment of a job queue lengths table for storing job queue length information for various nodes within a cluster of data storage nodes. As depicted, the table includes four entries corresponding with nodes Node1, Node3, Node4, and Node7. Each row in the table includes the job queue length for a particular node, the average job queue length for the particular node over a particular period of time (e.g., the average job queue length over the past ten minutes), and a timestamp for when the job queue length information was written to the table. In one embodiment, each entry in the job queue lengths table may have been entered in response to a particular node within the cluster of data storage nodes detecting that a job queue length for a job queue associated with the particular node was greater than an upper queue length threshold. In another embodiment, each node within the cluster of data storage nodes may periodically publish or write job queue length information to the job queue lengths table (e.g., each node may provide updated job queue length information every ten minutes).

Figure 4D:
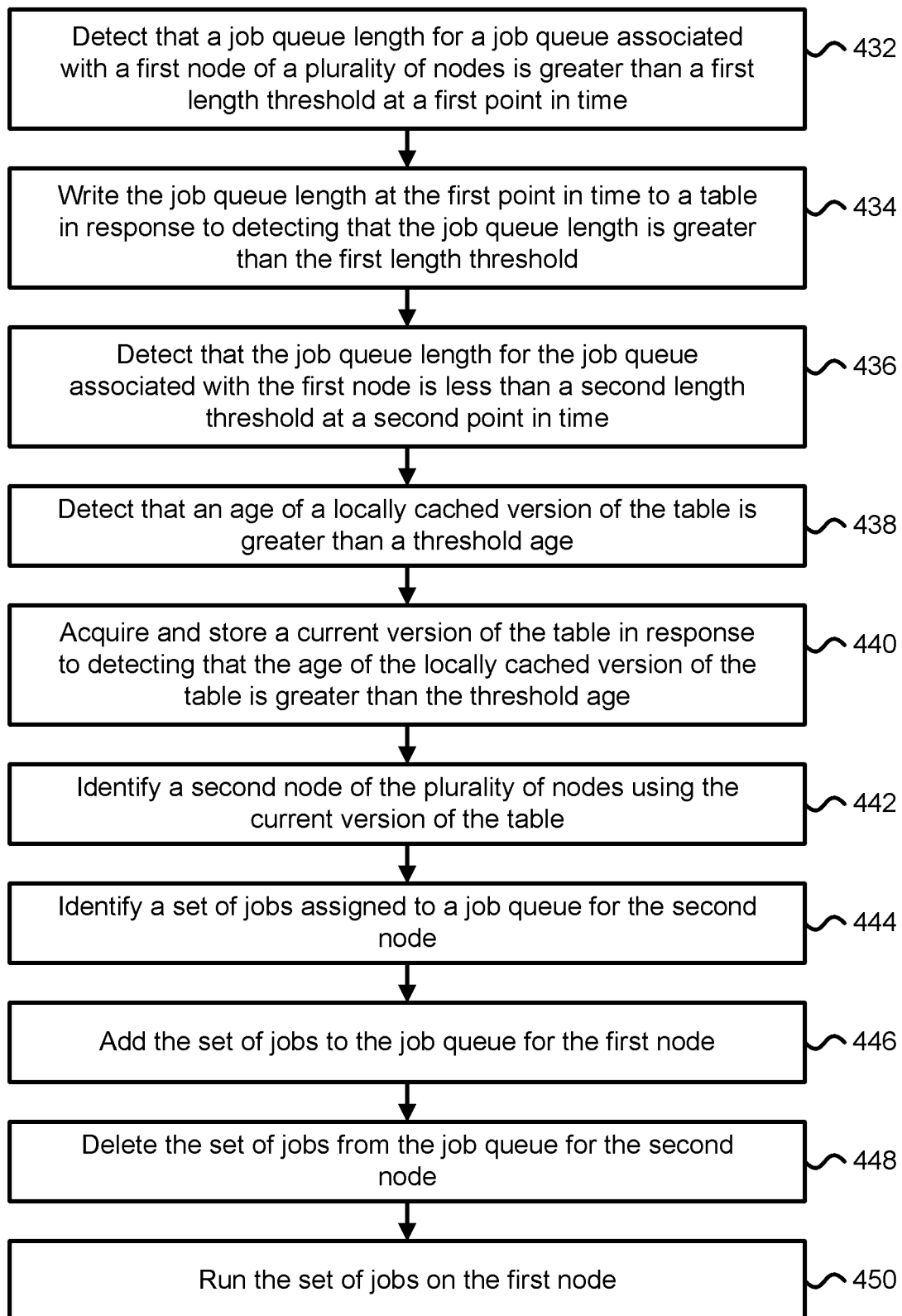
FIG. 4D is a flowchart describing one embodiment of a process for load balancing jobs running within a distributed system of data storage nodes via job stealing.

FIG. 4D is a flowchart describing one embodiment of a process for load balancing jobs running within a distributed system of data storage nodes via job stealing. In one embodiment, the process of FIG. 4D may be performed by a storage appliance, such as storage appliance 170 or storage appliance 140 in FIG. 1A. The process of FIG. 4D may be performed by a data storage node, such as node 141 in FIG. 1D.

In step 432, it is detected that a job queue length for a job queue associated with a first node of a plurality of nodes is greater than a first length threshold at a first point in time. The job queue associated with the first node at the first point in time may correspond with the job queue depicted in FIG. 4A at time T1 and the first length threshold may correspond with the upper queue length threshold 418 in FIG. 4A. In step 434, the job queue length at the first point in time is written to a table in response to detecting that the job queue length is greater than the first length threshold. In one example, the job queue length at the first point in time may be written to a job queue lengths table, such as the job queue lengths table depicted in FIG. 4C. The job queue length at the first point in time may comprise the total number of jobs in the job queue associated with the first node at the first point in time. In some cases, the first node may publish its job queue length to the table on a periodic basis and/or whenever new jobs are added to the job queue associated with the first node and the job queue length is greater than an upper queue length threshold. In some embodiments, step 432 and step 434 may be omitted.

In step 436, it is detected that the job queue length for the job queue associated with the first node is less than a second length threshold at a second point in time. The second point in time may be subsequent to the first point in time. The job queue associated with the first node at the second point in time may correspond with the job queue depicted in FIG. 4A at time T2 and the second length threshold may correspond with the lower queue length threshold 416 in FIG. 4A. The plurality of nodes may correspond with the data storage nodes within a storage appliance, such as storage appliance 140 in FIG. 1A.

In one embodiment, in response to detecting that the job queue length for the job queue associated with the first node is less than the second length threshold (e.g., that the job queue associated with the first node has less than five job entries), the first node may randomly identify a second node of the plurality of nodes, steal a job from a job queue for the second node, and move that job to the job queue for the first node. In some cases, the number of jobs that are stolen by the first node may depend on a difference between the job queue length for the job queue associated with the first node and a lower queue length threshold. In one example, if the difference between the job queue length for the job queue associated with the first node and the lower queue length threshold is two jobs, then the first node may steal two jobs from the job queue for the second node. In other cases, the number of jobs that are stolen by the first node may depend on a difference between the job queue length for the job queue associated with the second node and an upper queue length threshold. In one example, if the difference between the job queue length for the job queue associated with the second node and the upper queue length threshold is greater than a threshold number of jobs (e.g., is more than four jobs), then the first node may steal more than one job from the job queue for the second node; otherwise, if the difference between the job queue length for the job queue associated with the second node and the upper queue length threshold is not greater than the threshold number of jobs, then the first node may steal only one job from the job queue for the second node.

In some embodiments, the first node may determine a total number of nodes of the plurality of nodes that have job queue lengths greater than a threshold queue length size (e.g., the number of nodes that have job queue lengths greater than twenty) and identify the second node by generating a random number and identifying the second node based on the random number if the total number of nodes that have job queue lengths greater than the threshold queue length size is less than a threshold number of nodes. In one example, if the total number of nodes in a cluster of data storage nodes that have job queue lengths greater than twenty is less than two, then the second node may be randomly selected using a random number generator. However, if the total number of nodes in the cluster of data storage nodes that have job queue lengths greater than twenty is greater than two, then the second node may be identified by acquiring a table of job queue lengths for the cluster of data storage nodes and identifying the second node based on the job queue lengths for multiple nodes within the cluster of data storage nodes.

In step 438, it is detected that an age of a locally cached version of the table, such as the job queue length table depicted in FIG. 4C, is greater than a threshold age (e.g., the table has been locally cached on the first node for more than twenty minutes). The threshold age for the locally cached version of the table may be set by an end user of a storage appliance. The threshold age may be dynamically adjusted over time based on a rate of change for an average job queue length for the first node. In one example, if the job queue length for the job queue associated with the first node has not varied more than five jobs over the past ten minutes, then the threshold age may be set to ten minutes; however, if the job queue length for the job queue associated with the first node has varied more than five jobs over the past ten minutes, then the threshold age may be set to five minutes.

In step 440, a current version of the table is acquired in response to detecting that the age of the locally cached version of the table is greater than the threshold age. The current version of the table may be stored or cached using the first node. The current version of the table may be cached using a Flash-based cache within the first node. The first node may set a timestamp for when the current version of the table is cached and may use the timestamp in order to determine if the cached version of the table is older than the threshold age.

In step 442, a second node of the plurality of nodes is identified using the current version of the table. In one embodiment, the second node may be identified as the node within the plurality of nodes with the highest job queue length or the greatest number of queued jobs above an upper queue length threshold. In another embodiment, the second node may be identified as the node in the plurality of nodes with the greatest number of user-triggered jobs or the greatest number of jobs assigned with a particular priority (e.g., a high level priority) and positioned within job queues above the upper queue length threshold. In one example, if the jobs 425-426 depicted in FIG. 4B comprise user-triggered jobs and jobs 427 and 424 in FIG. 4B comprise non-user-triggered jobs, then the total number of user-triggered jobs that are positioned within the job queue above the upper queue length threshold may comprise two jobs.

In some embodiments, the second node may be identified randomly from among a set of nodes of the plurality of nodes that have job queue lengths greater than an upper queue length threshold. The plurality of nodes may comprise ten total nodes and out of the ten total nodes four nodes may correspond with job queue lengths greater than the upper queue length threshold; in this case, the second node may be identified by randomly selecting one of the four nodes that have a job queue length greater than the upper queue length threshold.

In step 444, a set of jobs assigned to a job queue for the second node is identified. The set of jobs may comprise one or more jobs. In one embodiment, the number of jobs to be stolen from the job queue for the second node or moved from the job queue for the second node to the job queue for the first node may be determined based on the job queue length for the first node and/or the job queue length for the second node. In one example, if the job queue length for the first node is less than a lower queue length threshold by more than a threshold number of jobs (e.g., is below the lower queue length threshold by more than two jobs), then the first node may steal two jobs from the job queue for the second node; however, if the job queue length for the first node is not less than the lower queue length threshold by more than the threshold number of jobs (e.g., the job queue length for the first node is not more than two jobs below the lower queue length threshold), then the first node may steal only one job from the job queue for the second node. In step 446, the set of jobs is added to the job queue for the first node. The set of jobs may be added to the job queue for the first node by adding entries for the set of jobs to the job queue for the first node. In step 448, the set of jobs is deleted from the job queue for the second node. The set of jobs may be deleted from the job queue for the second node by deleting entries for the set of jobs from the job queue for the second node. In step 450, the set of jobs is run on the first node.

Figure 4E:
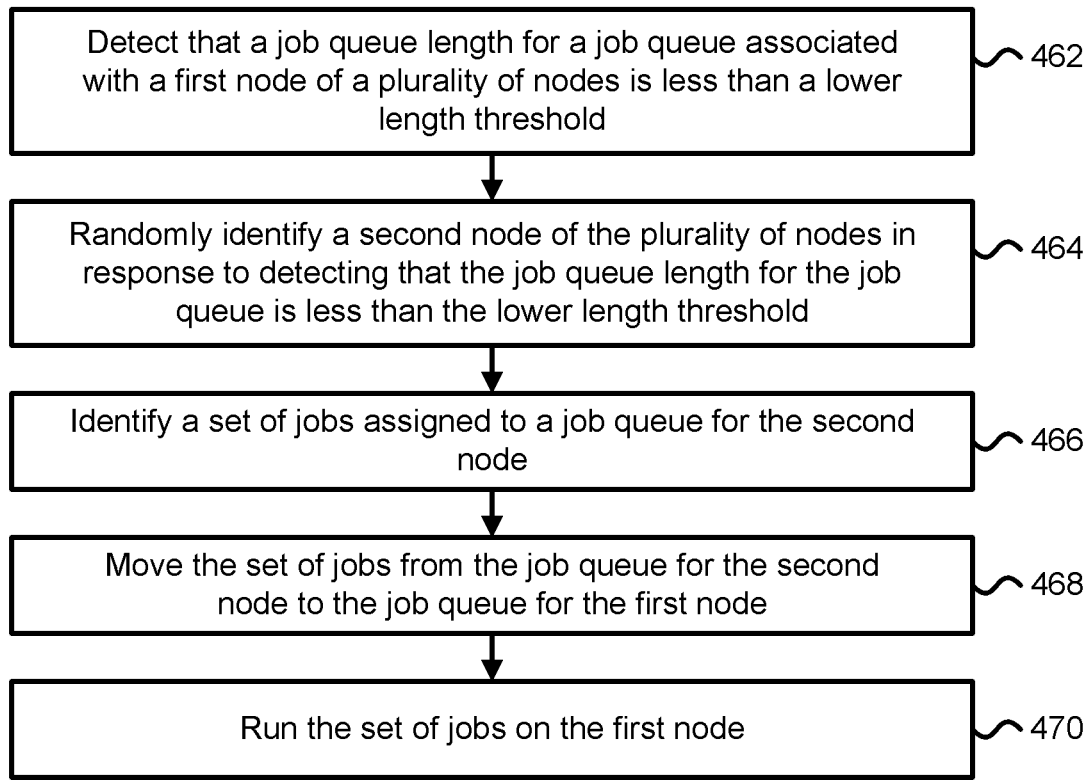
FIG. 4E is a flowchart describing an alternative embodiment of a process for load balancing jobs running within a distributed system of data storage nodes via job stealing.

FIG. 4E is a flowchart describing an alternative embodiment of a process for load balancing jobs running within a distributed system of data storage nodes via job stealing. In one embodiment, the process of FIG. 4E may be performed by a storage appliance, such as storage appliance 170 or storage appliance 140 in FIG. 1A. The process of FIG. 4E may be performed by a data storage node, such as node 141 in FIG. 1D.

In step 462, it is detected that a job queue length for a job queue associated with the first node of a plurality of nodes is less than a lower length threshold. In one example, it may be detected that the job queue length for the first node is less than a lower queue length threshold or that the job queue length for the first node is less than four. In step 464, a second node of the plurality of nodes is randomly identified or selected in response to detecting that the job queue length for the job queue associated with the first node is less than the lower length threshold. In one embodiment, the first node may randomly select a node within the plurality of nodes and determine whether that node corresponds with a job queue length greater than an upper queue length threshold. If the randomly selected node does not have a job queue length greater than the upper queue length threshold, then the first node may randomly select another node within the plurality of nodes in order to randomly find a node within the plurality of nodes that has a job queue length greater than the upper queue length threshold. In another embodiment, the first node may randomly select the second node regardless of the job queue length for the job queue associated with the second node.

In step 466, a set of jobs assigned to a job queue for the second node is identified. In one example, the set of jobs may comprise the last job added to the job queue for the second node. In another example, the set of jobs may comprise the last two jobs added to the job queue for the second node. In another example, the set of jobs may comprise the last user-triggered job added to the job queue for the second node. In step 468, the set of jobs is moved from the job queue for the second node to the job queue for the first node. The set of jobs may be moved from the second node to the first node by adding queue entries for the set of jobs to the job queue for the first node and deleting queue entries for the set of jobs from the job queue for the second node. In step 470, in time, the set of jobs may be run on the first node or using the first node. The first node may select a first job of the set of jobs at the head of the job queue for the first node to be run prior to running a second job positioned behind the first job within the job queue.

Figure 5A:
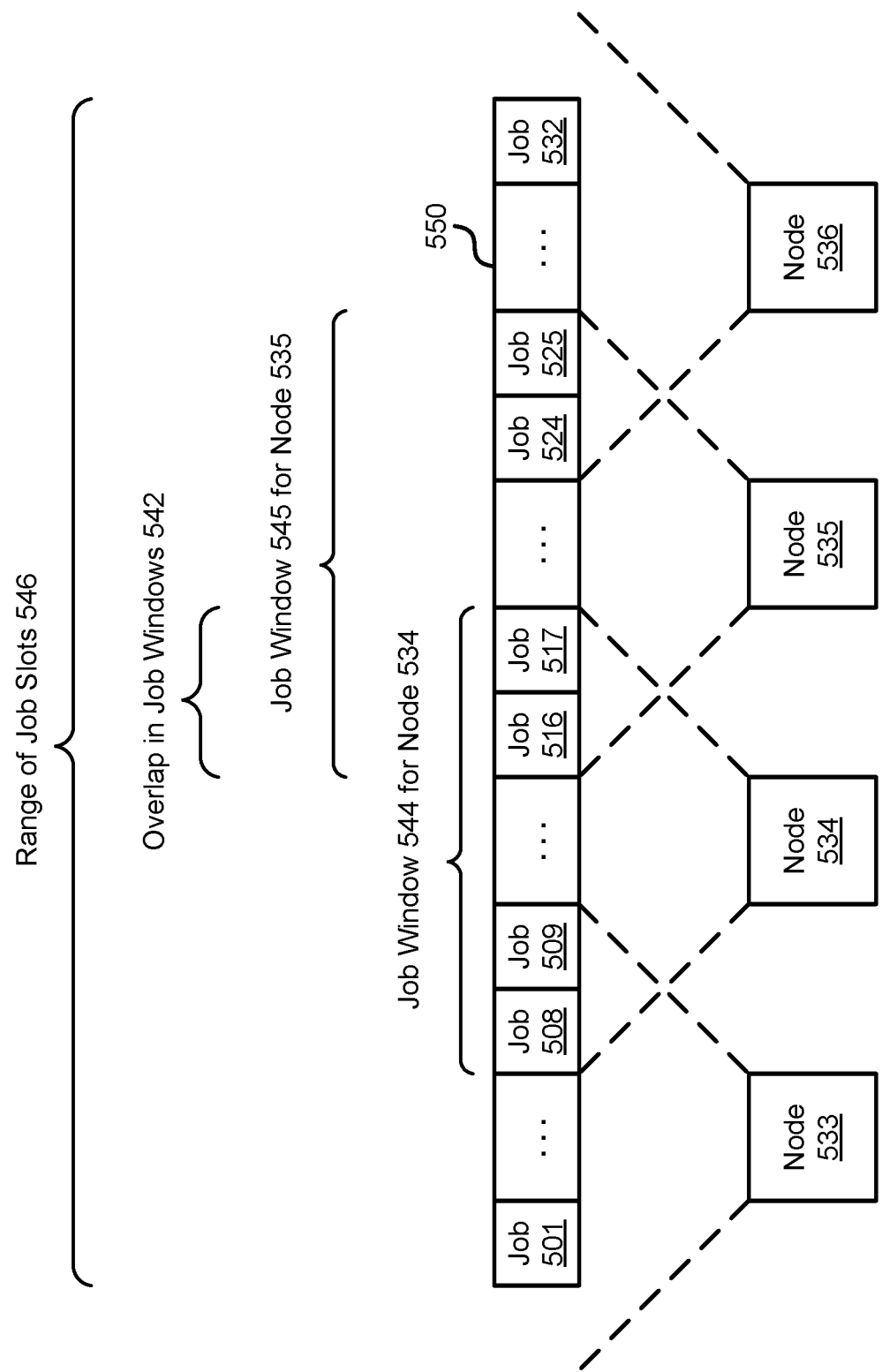
FIG. 5A depicts one embodiment of a plurality of data storage nodes and mappings of sets of candidate jobs to the plurality of data storage nodes.

FIG. 5A depicts one embodiment of a plurality of data storage nodes and mappings of sets of candidate jobs to the plurality of data storage nodes. The plurality of data storage nodes includes nodes 533-536. The data storage node 534 may correspond with node 141 in FIG. 1D and the data storage node 535 may correspond with node 147 in FIG. 1D. As depicted, a table of candidate jobs 550 storing jobs to be run using the plurality of data storage nodes includes 32 slots with candidate job 501 assigned to a $1^{st}$ slot of the 32 slots and candidate job 532 assigned to the $32^{nd}$ slot of the 32 slots. The table of candidate jobs 550 may be stored using a distributed metadata store, such as the distributed metadata store 110 in FIG. 1C, that is accessible by each of the plurality of data storage nodes.

Each node of the data storage nodes 533-536 may access or read the entire table of candidate jobs 550 or a portion of the table of candidate jobs 550 corresponding with a per node mapping of a set of candidate jobs for the node. A distributed job scheduler, such as distributed job scheduler 108 in FIG. 1C, may assign candidate jobs to positions within the table of candidate jobs 550 such that the candidate jobs are load balanced across the plurality of data storage nodes. The distributed job scheduler may assign 32 different candidate jobs to the 32 slots (i.e., each of the 32 slots may be filled by a candidate job) or may assign fewer candidate jobs to the table of candidate jobs 550 than the number of slots available. In one example, 12 candidate jobs may be assigned to 12 slots out of the maximum 32 slots available within the table of candidate jobs.

In one embodiment, the distributed job scheduler may assign candidate jobs to positions within the table of candidate jobs 550 such that the number of candidate jobs polled by each node of the data storage nodes is the same or within a particular range of candidate jobs (e.g., each node may select between four and ten candidate jobs). Each node may map to a job window corresponding with a subset of the 32 slots within the table of candidate jobs 550. The distributed job scheduler may balance the number of candidate jobs within each job window to be between a first number of candidate jobs (e.g., four candidate jobs) and a second number of candidate jobs (e.g., ten candidate jobs) greater than the first number of candidate jobs.

Each candidate job within the table of candidate jobs 550 may be associated with one or more attributes, such as a time at which the candidate job was added to the table of candidate jobs 550, an age of the candidate job (e.g., corresponding with how long the candidate job has been listed in the table of candidate jobs and not assigned to a job queue), a priority level assigned to the candidate job, or a queue placement identifier specifying whether the candidate job has been assigned to or placed on a job queue for execution on a data storage node. The one or more attributes may be written to the table of candidate jobs 550 or be stored in a separate table that is accessible by each of the plurality of data storage nodes.

As depicted in FIG. 5A, the range of jobs slots 546 corresponds with the maximum number of candidate job slots within the table of candidate jobs 550. A first node 533 may map to a first set of candidate jobs corresponding with the first nine slots within the table of candidate jobs 550. The first node 533 may determine whether to add one or more of the candidate jobs within the first set of candidate jobs to a job queue for the first node 533 based on a current job queue length for the job queue, a priority value assigned to each job of the first set of candidate jobs, and/or an age of each job of the first set of candidate jobs. The current job queue length may correspond with the number of job entries within the job queue for the first node 533. The priority value may correspond with a priority identifier assigned to a candidate job (e.g., a user-triggered job). The age of a candidate job may be determined based on a time at which the candidate job was added to the table of candidate jobs 550 and the current time of polling the candidate jobs. In one example, the first node 533 may place all nine jobs 501-509 on the job queue for the first node 533. In another example, the first node 533 may place a subset of the nine jobs 501-509 (e.g., three of the jobs) on the job queue for the first node 533. The subset may be identified as the three jobs out of the nine jobs 501-509 that have been classified as high priority jobs and/or have the oldest ages out of the nine jobs 501-509. In another example, the subset may be randomly selected.

As depicted in FIG. 5A, node 533 may select candidate jobs from among jobs 501-509, node 534 may select candidate jobs from among jobs 508-517, node 535 may select candidate jobs from among jobs 516-525, and node 536 may select candidate jobs from among jobs 524-532. The job window 544 for node 534 spans a range between the $8^{th}$ slot occupied by job 508 and the $17^{th}$ slot occupied by job 517. The job window 545 for node 535 spans a range between the $16^{th}$ slot occupied by job 516 and the $25^{th}$ slot occupied by job 525. Thus, there may exist overlaps in coverage of the candidate job slots within the table of candidate jobs 550. The overlap in job windows 542 corresponds with the $16^{th}$ and $17^{th}$ job candidate slots within the table of candidate jobs 550. In this case, candidate job 516 may be picked up by either node 534 or node 535. Candidate job 517 may also be picked up by either node 534 or node 535. Similarly, candidate job 509 may be picked up by either node 533 or node 534. Candidate jobs that are assigned to slots corresponding with an overlap in job windows within the table of candidate jobs 550 may have a higher likelihood of being picked up by a node; thus, higher priority jobs may be assigned to overlap slots. Candidate jobs that are assigned to slots not corresponding with an overlap in job windows may only be picked up by one node of the plurality of nodes; thus, in cases where data affinity is important or a particular job must be run using a particular node, the particular job may be assigned to a slot that does not correspond with an overlap in job windows. The size of the overlaps may vary over time based on job queue lengths for the plurality of data storage nodes. In some cases, the size of the overlaps in job windows may be randomized and the amount of overlap may be randomly selected between no overlap and an overlap of a threshold number of candidate jobs (e.g., between no overlap and an overlap of at most ten candidate jobs).

Although the sizes of the job windows corresponding with nodes 534-535 in FIG. 5A are the same (i.e., are ten slots wide), the size of the job window 544 for node 534 and the size of the job window 545 for node 535 may vary over time and may comprise different sizes. In one example, if a job queue length for node 534 is less than a job queue length for node 535, then the size of the job window 544 for node 534 may be set wider than the size of the job window 545 for node 535. In another example, if the job queue length for node 534 is less than a queue length threshold (e.g., has less than five jobs), then the job window 544 may be set such that the node 534 may select among twenty candidate jobs within the table of candidate jobs 550; however, if the job queue length for node 534 is greater than or equal to the queue length threshold, then the job window 544 may be set such that the node 534 may select among ten candidate jobs within the table of candidate jobs 550.

Figure 5B:
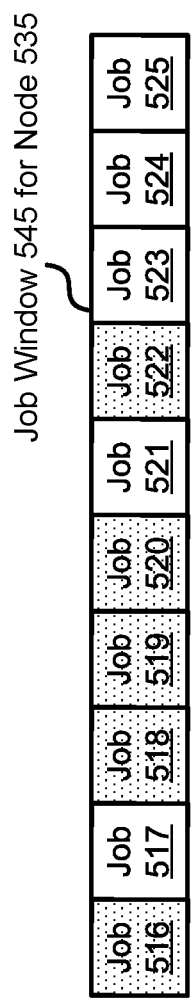
FIG. 5B depicts one embodiment of a portion of the table of candidate jobs corresponding with a job window.

FIG. 5B depicts one embodiment of a portion of the table of candidate jobs 550 depicted in FIG. 5A corresponding with the job window for data storage node 535. The node 535 may periodically poll or access the job window assigned to the node 535 and may select one or more of the candidate jobs from the candidate jobs within the job window. As depicted, node 535 may select among ten candidate jobs 516-525 and has selected five jobs 516, 518-520, and 522 to be placed on the job queue for the node 535 for future execution on the node 535. Upon placement of a candidate job on the job queue, the candidate job may remain in the table of candidate jobs (e.g., to protect against node failures) and an attribute may be set specifying that candidate job has already been assigned to a job queue. After the job has completed execution on the node 535, the corresponding entry for the job within the table of candidate jobs may be removed creating a slot vacancy.

Figure 5C:
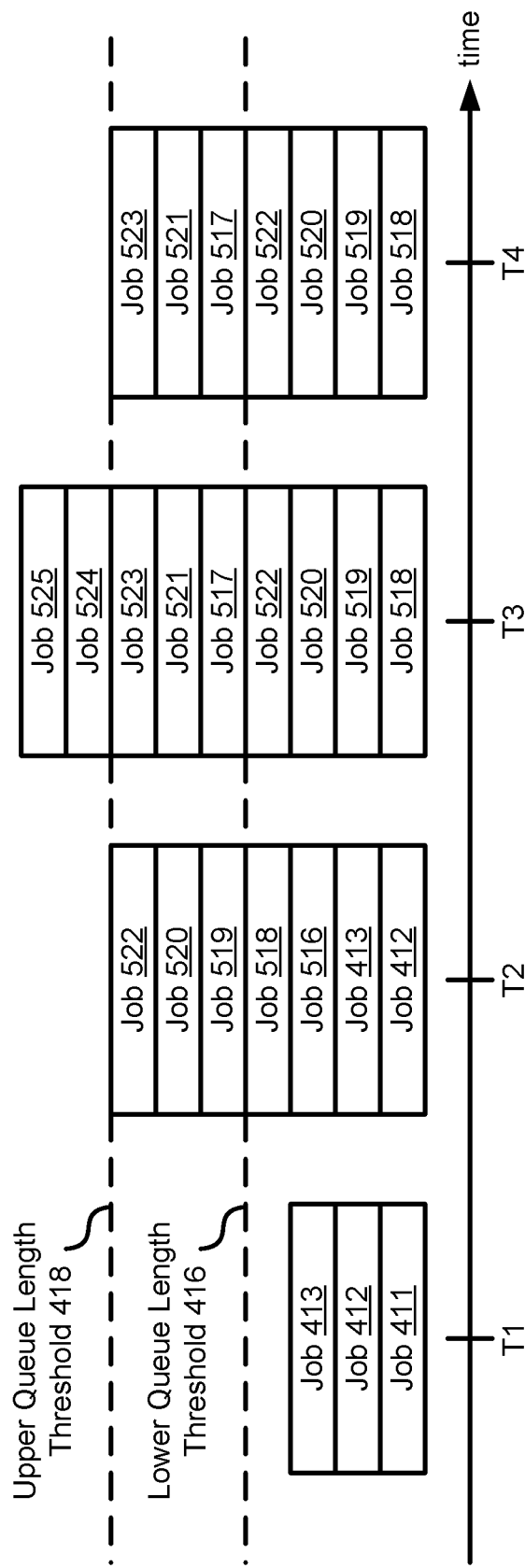
FIG. 5C depicts one embodiment of the job queue associated with a data storage node.

FIG. 5C depicts one embodiment of the job queue associated with data storage node 535 depicted in FIG. 5A. As depicted, at time T1, the job queue holds three jobs 411-413. Subsequent to time T1, the node 535 may select the five jobs 516, 518-520, and 522 within the job window for node 535 and placed them on the job queue. At time T2, the five jobs 516, 518-520, and 522 have been placed on the job queue for future execution on node 535. Between times T1 and T2, job 411 was executed on node 535 and has been removed from the job queue. Subsequent to time T2, the remaining five jobs 517, 521, and 523-525 have been placed on the job queue and jobs 412-413 and 516 have been executed using node 535. At time T3, the five jobs 517, 521, and 523-525 have been placed on the job queue and the jobs 412-413 and 516 have been removed from the job queue. At time T4, jobs 524-525 have been removed from the job queue due to job stealing or the transfer of jobs 524-525 to a second node of the plurality of nodes (e.g., node 534 in FIG. 5A).

Figure 6A:
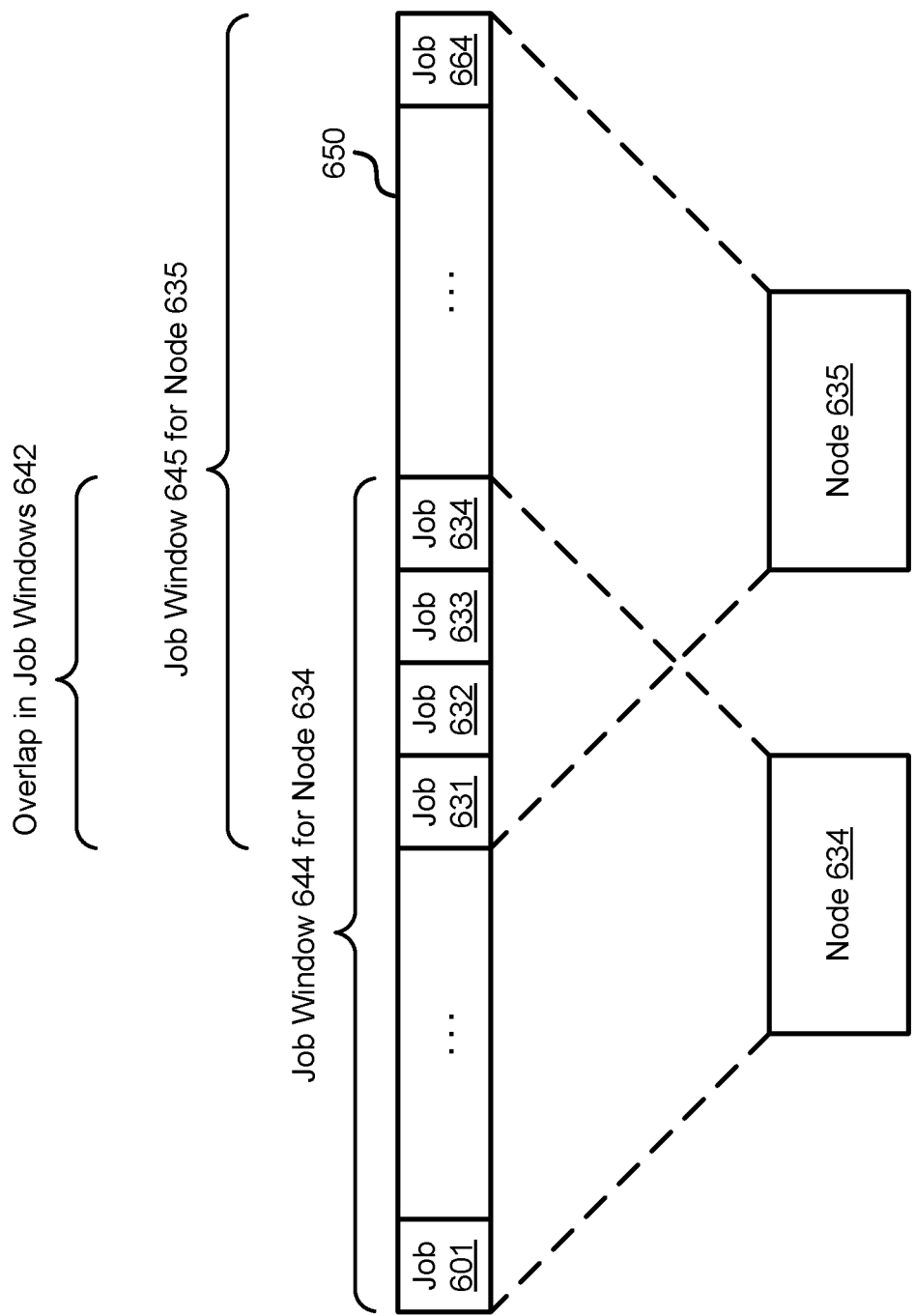
FIG. 6A depicts another embodiment of a plurality of data storage nodes and mappings of sets of candidate jobs to the plurality of data storage nodes.

FIG. 6A depicts another embodiment of a plurality of data storage nodes and mappings of sets of candidate jobs to the plurality of data storage nodes. The plurality of data storage nodes includes nodes 634-635. As depicted, a table of candidate jobs 650 storing candidate job entries for jobs to be run using the plurality of data storage nodes includes 64 slots with candidate job 601 assigned to a $1^{st}$ slot of the 64 slots and candidate job 664 assigned to the $64^{th}$ slot of the 64 slots. The table of candidate jobs 650 may be stored using a distributed metadata store, such as the distributed metadata store 110 in FIG. 1C, that is accessible by each of the plurality of data storage nodes. A distributed job scheduler, such as distributed job scheduler 108 in FIG. 1C, may assign candidate jobs to positions within the table of candidate jobs 650 such that the candidate jobs are load balanced across the plurality of data storage nodes. The node 634 may choose or select jobs among the 34 candidate jobs corresponding with jobs 601-634 within the job window 644 to be placed on the job queue for node 634 and node 635 may choose or select among the 34 candidate jobs corresponding with jobs 631-664 within the job window 645 to be placed on the job queue for node 635. In this case, the overlap in job windows 642 comprises four candidate job slots within the table of candidate jobs 650.

Figure 6B:
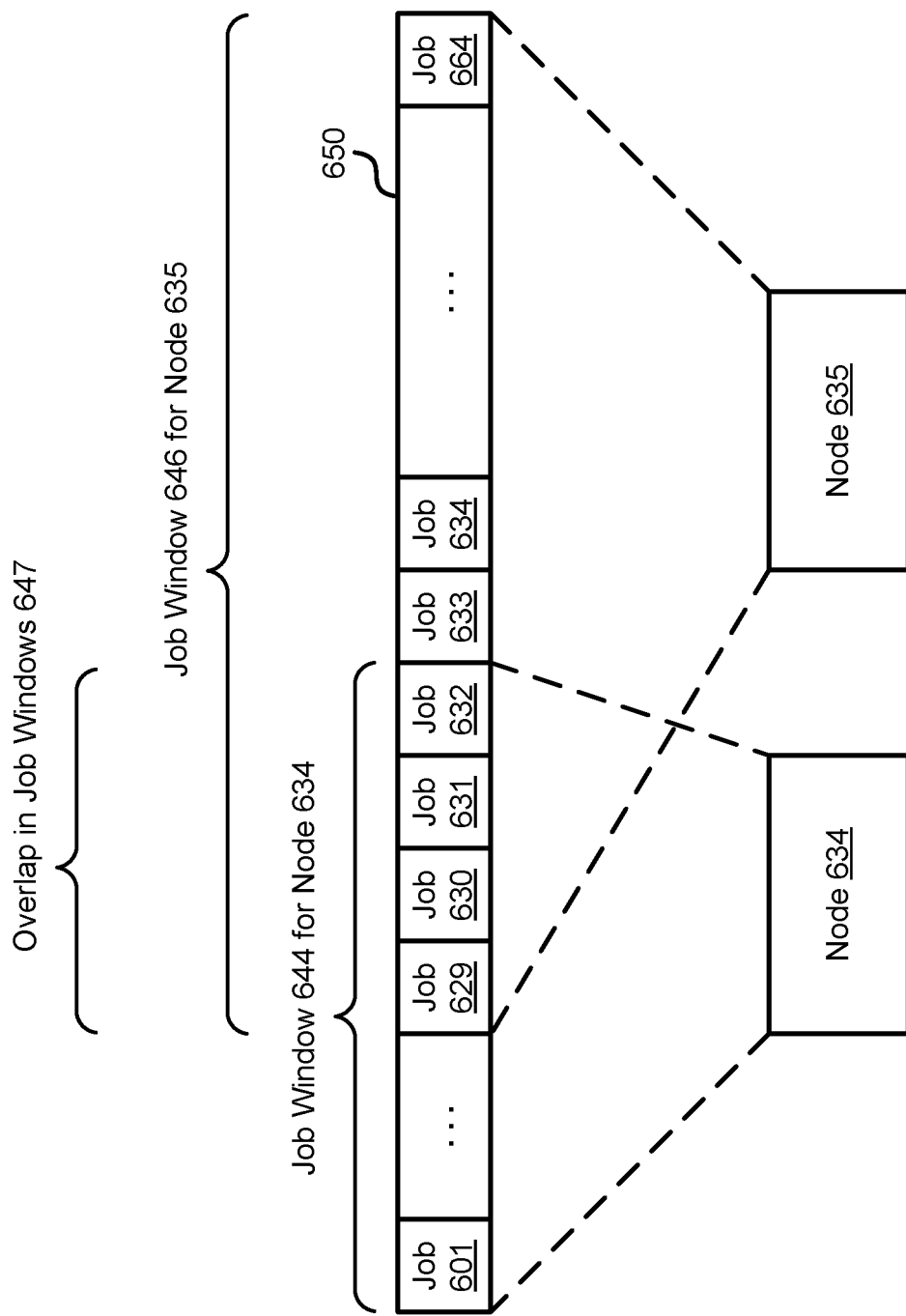
FIG. 6B depicts one embodiment of the table of candidate jobs depicted in FIG. 6A in which the job window for a node has been adjusted.

FIG. 6B depicts one embodiment of the table of candidate jobs 650 depicted in FIG. 6A in which the job window 644 for node 634 has been resized and is of a different size than the job window 646 for node 635. In this case, node 634 may select among candidate jobs positioned within 32 slots while node 635 may select among candidate jobs positioned within 36 slots. As depicted, node 635 may select among candidate jobs including jobs 629-634 and 664 to place on the job queue for node 635 and node 634 may select among candidate jobs including jobs 601 and 629-632 to place on the job queue for node 634. The job window 646 may be set based on a job queue length for the node 635 or an average job queue length for the node 635. The job window 646 may be wider than the job window 644 or correspond with a greater number of candidate job slots within the table of candidate jobs 650 compared with the job window 644.

Figure 7A:
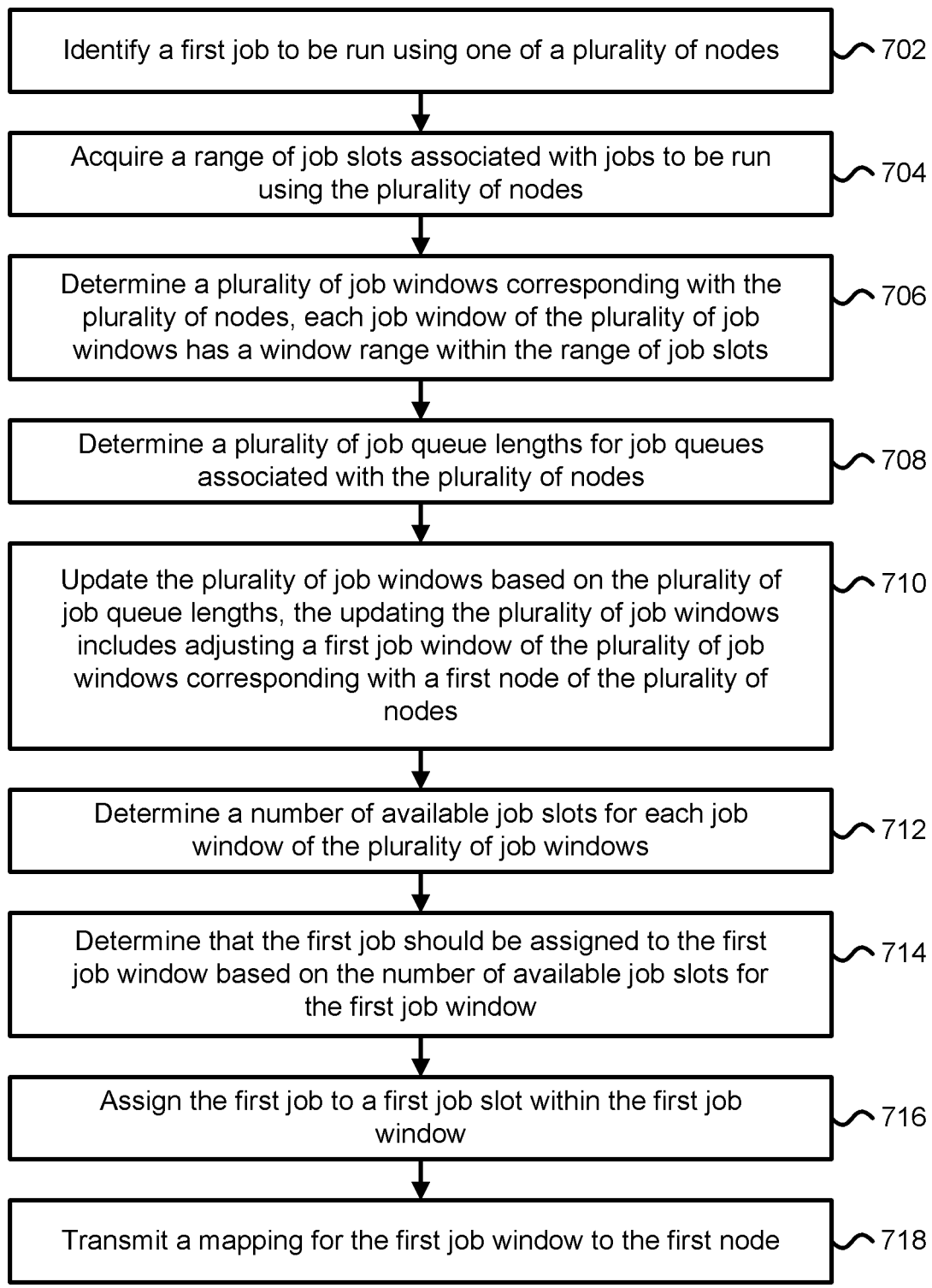
FIG. 7A is a flowchart describing one embodiment of a process for assigning a candidate job to a particular slot within a table of candidate jobs corresponding with jobs to be run using data storage nodes within a cluster.

FIG. 7A is a flowchart describing one embodiment of a process for assigning a candidate job to a particular slot within a table of candidate jobs corresponding with jobs to be run using data storage nodes within a cluster. In one embodiment, the process of FIG. 7A may be performed by a storage appliance, such as storage appliance 170 or storage appliance 140 in FIG. 1A. The process of FIG. 7A may be performed by a distributed job scheduler, such as distributed job scheduler 108 in FIG. 1C.

In step 702, a first job to be run using one of a plurality of nodes is identified. The first job may comprise one of a number of jobs that may be executed using a plurality of data storage nodes, such as a user-triggered job to capture a snapshot of a real or virtual machine, a periodic backup job for capturing a snapshot of a real or virtual machine, a garbage collection job, a job for downloading or transferring an electronic file associated with a virtual machine, or a job for consolidating one or more snapshots of a real or virtual machine. The plurality of nodes may correspond with a cluster of data storage nodes. In step 704, a range of job slots associated with jobs to be run using the plurality of nodes is acquired. The range of job slots may correspond with a number of candidate job slots in a table of candidate jobs, such as the table of candidate jobs 550 in FIG. 5A with a range of 32 job slots. In one example, the range of job slots may be fixed at a maximum number of job slots or may vary over time as data storage nodes are added to the plurality of nodes or as data storage nodes are removed from the plurality of nodes.

In one embodiment, the number of candidate job slots within a table of candidate jobs, such as the table of candidate jobs 650 in FIG. 6A, may be set based on a number of data storage nodes within a cluster. In one example, the number of candidate job slots within a table of candidate jobs may comprise a multiple of the number of data storage nodes within a cluster (e.g., ten times or twenty times the number of data storage nodes within the cluster). As the number of candidate job slots within a table of candidate jobs is adjusted (e.g., increased or decreased), updated mappings for the job windows that have been resized or shifted may be transmitted to the affected data storage nodes.

In step 706, a plurality of job windows corresponding with the plurality of nodes is determined. Each job window of the plurality of job windows has a window range within the range of job slots. In the case that the plurality of nodes comprises two nodes, the two nodes may correspond with nodes 634-635 in FIG. 6B and the plurality of job windows may comprise job window 644 and job window 646. In step 708, a plurality of job queue lengths for job queues associated with the plurality of nodes is determined. The plurality of job queue lengths may be determined via acquisition of a job queue lengths table, such as the job queue lengths table depicted in FIG. 4C.

In step 710, the plurality of job windows is updated based on the plurality of job queue lengths. In some cases, the updating of the plurality of job windows may include adjusting a first job window of the plurality of job windows corresponding with a first node of the plurality of nodes. In one example, the number of candidate job slots within the first job window may be increased or decreased randomly between a first number of slots (e.g., ten slots) and a second number of slots (e.g., twenty slots). In another example, the size of the first job window may be adjusted based on the job queue length for the first node. The first job window may be adjusted by transmitting a mapping of the job slots within a table of candidate jobs from which the first node may select jobs to be placed on the job queue for the first node to the first node. In some cases, the mapping may comprise a job slot function that maps a node identifier for the first node to a subset of job slots within the table of candidate jobs. In other cases, the mapping may comprise a listing of job slots within the table of candidate jobs for the first job window.

In step 712, a number of available jobs slots for each job window of the plurality of job windows is determined. The number of available jobs slots for the first job window may comprise the number of open slots within the first job window for which new jobs may be assigned (e.g., by a job scheduler). As jobs are completed by the first node, the entries for the completed jobs within the first job window may be removed, thereby creating open slots within the first job window. In step 714, it is determined that the first job should be assigned to the first job window based on the number of available job slots for the first job window. In one example, the first job window may correspond with job window 644 in FIG. 6B and a distributed job scheduler may assign the first job to the job window 644 if the job window 644 has a greater number of available job slots than the job window 646. In some cases, the first job window may be randomly selected from the plurality of job windows.

In step 716, the first job is assigned to a first job slot within the first job window. The first job may be assigned to the first job slot by updating a table of candidate jobs, such as the table of candidate jobs 650 in FIGS. 6A-6B, to store an entry for the first job corresponding with the first job slot. The table of candidate jobs may be stored using a distributed metadata store. In one example, the first job slot may be selected at random. In another example, the first job slot may comprise an overlap slot, such as the overlap slot for job 630 in FIG. 6B, if the first job comprises a user-triggered job. In another example, the first job slot may comprise a non-overlap slot, such as the non-overlap slot for job 634 in FIG. 6B, if the first job must be run using a particular node of the plurality of nodes.

In step 718, the first job window corresponding with the first node is transmitted to the first node. The first job window may be transmitted to the first node by transmitting a mapping for the first job window to the first node. The mapping may specify a list of job slots within a table of candidate jobs that include candidate jobs to be run using the first node. In some cases, a distributed job scheduler may periodically update the sizes of the job windows for data storage nodes within the cluster and may transmit an updated mapping corresponding with the first job window to the first node. In one example, the first node may correspond with node 635 in FIGS. 6A-6B and the first job window may increase in size from the job window 645 for node 635 in FIG. 6A that maps to slots held by jobs 631-664 to the job window 646 for node 635 in FIG. 6B that maps to slots held by jobs 629-664.

Figure 7B:
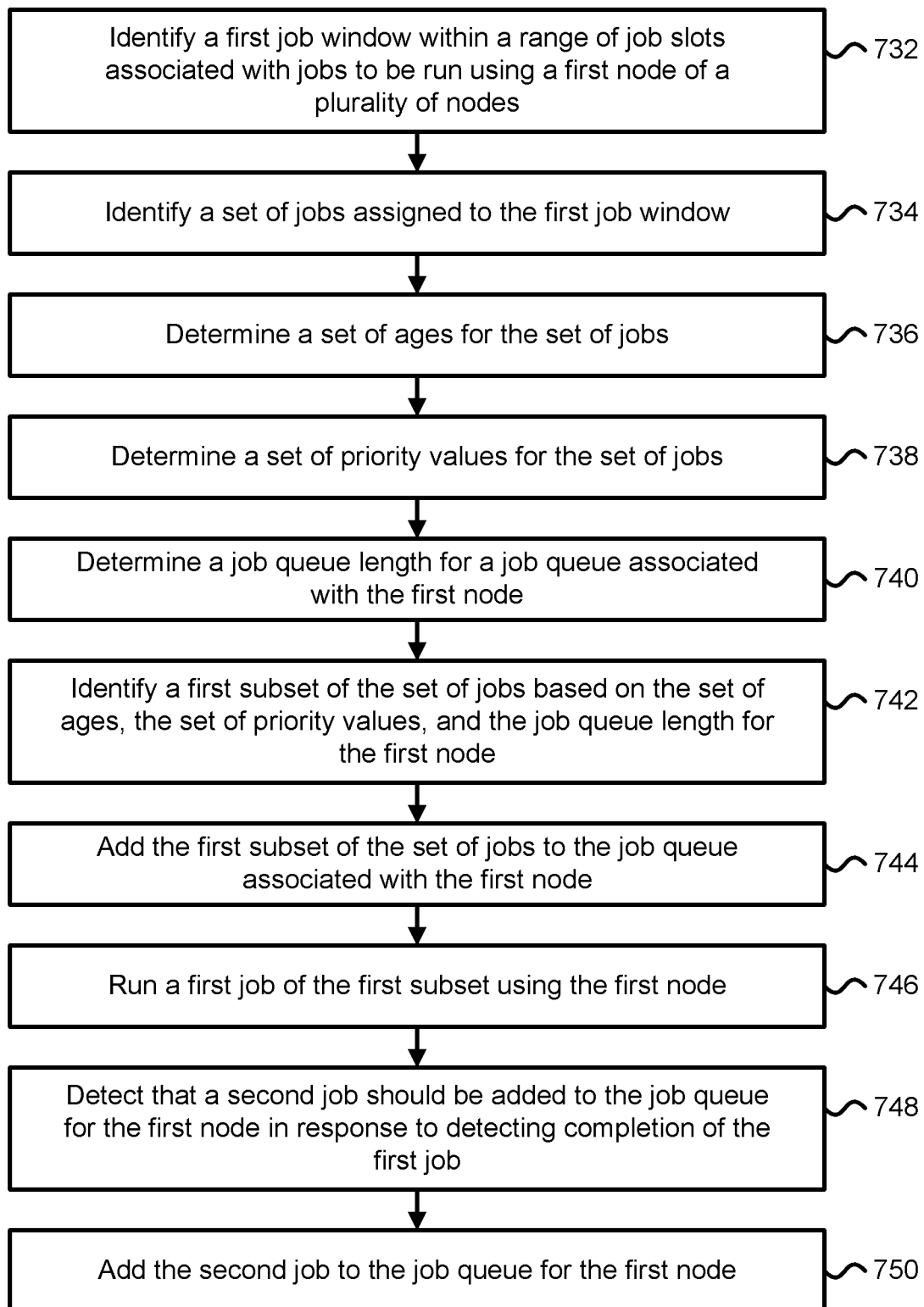
FIG. 7B is a flowchart describing one embodiment of a process for selecting jobs from candidate jobs within a job window and adding the selected jobs to a job queue associated with a data storage node.

FIG. 7B is a flowchart describing one embodiment of a process for selecting jobs from candidate jobs within a job window and adding the selected jobs to a job queue associated with a data storage node. In one embodiment, the process of FIG. 7B may be performed by a storage appliance, such as storage appliance 170 or storage appliance 140 in FIG. 1A. The process of FIG. 7B may be performed by a data storage node, such as node 141 in FIG. 1D.

In step 732, a first job window within a range of job slots associated with jobs to be run using a first node of a plurality of nodes is identified. The first job window may correspond with a subset of job slots within a table of candidate jobs, such as the table of candidate jobs 650 in FIG. 6A. The first job window may correspond with job window 646 for node 635 in FIG. 6B. In step 734, a set of jobs assigned to the first job window is identified. The set of jobs may correspond with jobs 629-664 in FIG. 6B. In some cases, the set of jobs may be determined by acquiring a mapping for the first job window that specifies a subset of the range of job slots and determining candidate jobs within the subset of the range of job slots that have not already been placed in a job queue or flagged as being processed by the first node or another data storage node within the plurality of nodes.

In step 736, a set of ages for the set of jobs is determined. The set of ages may correspond with an amount of time that each job of the set of jobs has been assigned to a job slot within the first job window and has not been selected for placement on a job queue associated with one of the plurality of nodes. In step 738, a set of priority values for the set of jobs is determined. Each job of the set of jobs may be associated with a job attribute, such as a priority value or whether the job comprises a user-triggered job. Jobs classified as user-triggered jobs may be given priority when selecting jobs to be added to a job queue for the first node. In step 740, a job queue length for a job queue associated with the first node is determined. The job queue associated with the first node may store a number of job entries corresponding with jobs to be processed or executed by the first node and the job queue length may comprise the number of job entries within the job queue. The job queue may comprise a FIFO in which the oldest job added to the job queue is processed first by the first node. The oldest job in the job queue may correspond with the head of the job queue.

In step 742, a first subset of the set of jobs is identified. In some cases, the first subset of the set of jobs may comprise all of the set of jobs. In other cases, the first subset of the set of jobs may comprise less than all of the set of jobs. The set of jobs may be identified using the set of ages, the set of priority values, and/or the job queue length for the first node. In one example, the number of jobs within the first subset may correspond with the number of slots within the job queue that are available before a queue length threshold (e.g., the upper queue length threshold) is reached. The first node may first select the jobs within the set of jobs that have been marked as high priority jobs and then select the jobs within the set of jobs with the oldest ages. The first node may first select jobs that have been classified as user-triggered jobs and add those jobs to the job queue followed by randomly selecting jobs from the set of jobs until the job queue has reached a particular job queue length (e.g., the job queue may be filled until the job queue stores ten total jobs or stores ten entries corresponding with ten total jobs).

In step 744, the first subset of the set of jobs is added to the job queue associated with the first node. In step 746, a first job of the first subset is run using the first node. The first job may correspond with the job of the first subset that was added to the job queue first. In step 748, it is detected that a second job should be added to the job queue for the first node. In this case, if the first job comprises one of a sequence of reoccurring jobs (e.g., the first job is associated with periodically backing up log files for a database every 15 minutes), then the first job may determine when the second job comprising the next instance of the first job needs to be run. If the second job needs to be run before the next polling of candidate jobs by the first node, then the first job may self-schedule the second job by placing the second job into the job queue associated with the first node. In one embodiment, it may be detected that the second job should be added to the job queue for the first node in response to detecting completion of the first job. In another embodiment, it may be detected that the second job should be added to the job queue for the first node prior to completion of the first job. In step 750, the second job is added to the job queue for the first node. In some cases, the second job may be added to the job queue for the first node without intervention by a job scheduler. The second job may be added to the job queue for the first node and an entry for the second job may be written to a table of candidate jobs and marked as assigned to the job queue for the first node.

Figure 7C:
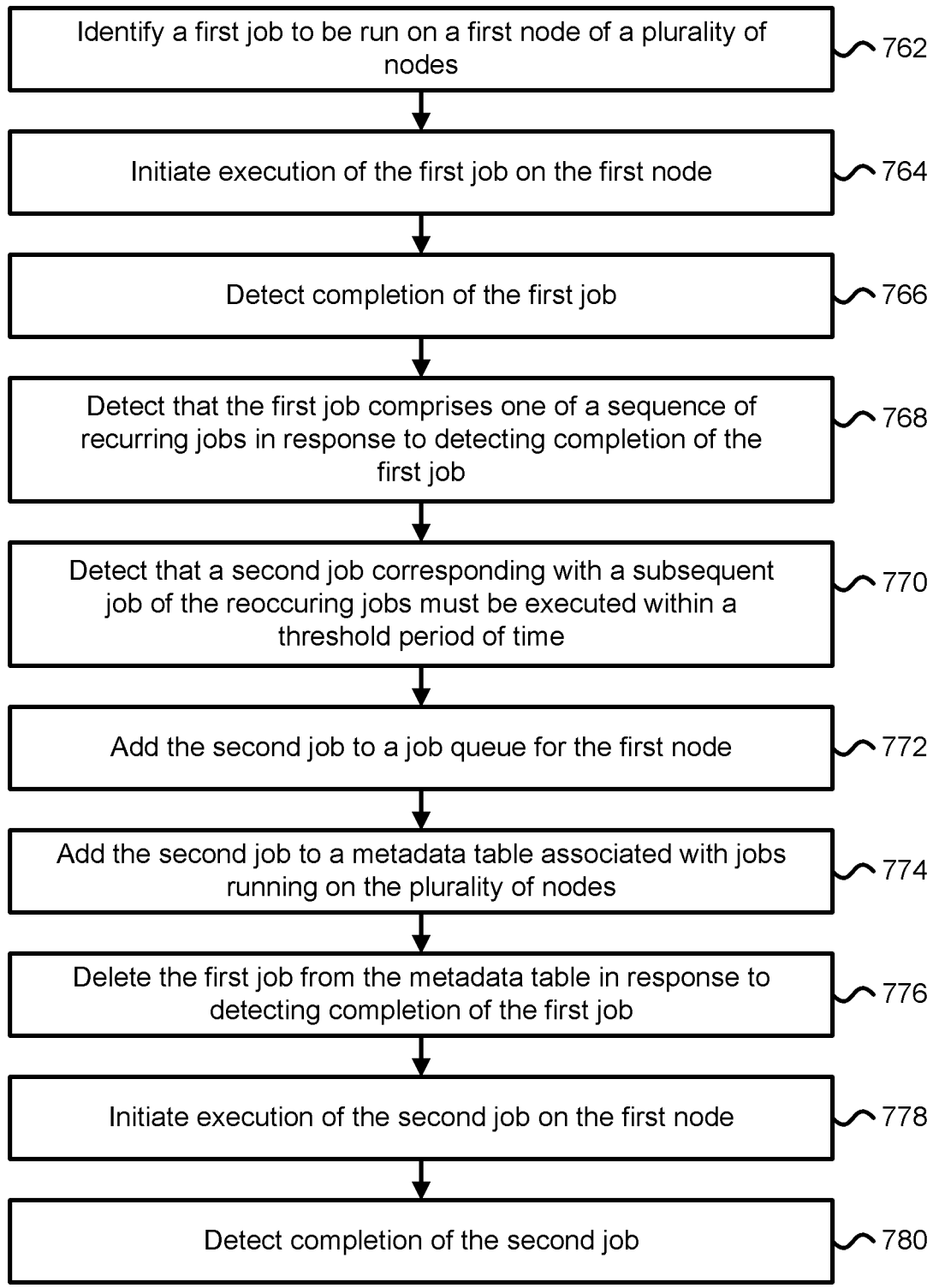
FIG. 7C is a flowchart describing one embodiment of a process for self-scheduling the next instance of a reoccurring job.

FIG. 7C is a flowchart describing one embodiment of a process for self-scheduling the next instance of a reoccurring job. In one embodiment, the process of FIG. 7C may be performed by a storage appliance, such as storage appliance 170 or storage appliance 140 in FIG. 1A. The process of FIG. 7C may be performed by an application or a job running on a data storage node, such as node 141 in FIG. 1D.

In step 762, a first job to be run on a first node of a plurality of nodes is identified. In step 764, execution of the first job on the first node is initiated. The first job may be taken from the head of a job queue for the first node and executed using one or more processors, such as processor 122 in FIG. 1C. In step 766, completion of the first job is detected. Upon completion of the first job, the first job may determine an amount of time remaining before a next instance of the first job needs to be rescheduled or run again. In step 768, it is detected that the first job comprises one of a sequence of reoccurring jobs in response to detecting completion of the first job. In step 770, it is detected that a second job corresponding with a subsequent job of the reoccurring jobs must be executed within a threshold period of time. The threshold period of time may correspond with a fraction of a polling frequency for selecting candidate jobs from a table of candidate jobs or a portion thereof and placing the selected jobs on the job queue for the first node. In one example, the polling of candidate jobs may be performed every ten minutes and the threshold period of time may be set to half of the ten minutes or five minutes. In step 772, the second job is added to a job queue for the first node. The second job may be self-scheduled by the first job instead of requiring the distributed job scheduler to schedule the second job for execution using the plurality of nodes.

In step 774, the second job is added to a metadata table associated with jobs running on the plurality of nodes. The metadata table may comprise a table of candidate jobs, such as the table of candidate jobs 650 in FIG. 6B. In step 776, the first job is deleted or removed from the metadata table in response to detecting completion of the first job. The removal of the first job from the metadata table may create an open slot within the metadata table that may be taken by subsequent candidate jobs assigned to the metadata table by a distributed job scheduler. In step 778, execution of the second job on the first node is initiated. In step 780, completion of the second job is detected. Upon completion of the second job, the second job may determine an amount of time remaining before a next instance of the second job needs to be rescheduled or run again. It may be detected that a third job corresponding with a subsequent job of the reoccurring jobs must be executed within a threshold period of time or prior to a next polling cycle for the first node. The third job may be self-scheduled by the second job instead of requiring the distributed job scheduler to schedule the third job for execution using the first node.

One embodiment of the disclosed technology includes identifying a set of candidate jobs assigned to a first job window associated with a first node of a cluster of data storage nodes, identifying a first subset of the set of candidate jobs, adding the first subset of the set of candidate jobs to a job queue for the first node, executing a first job of the first subset using the first node, detecting that the first job comprises one of a sequence of reoccurring jobs, detecting that a second job corresponding with a subsequent job of the reoccurring jobs should be added to the job queue for the first node prior to a next polling of candidate jobs within the first job window by the first node, adding the second job to the job queue for the first node, executing the second job using the first node, and storing data generated by the second job using the first node.

One embodiment of the disclosed technology includes a memory (e.g., a volatile or non-volatile memory) in communication with one or more processors. The memory configured to store a set of candidate jobs assigned to a first job window associated with a first node of a cluster of data storage nodes. The one or more processors configured to identify a first subset of the set of candidate jobs and add the first subset of the set of candidate jobs to a job queue for the first node. The one or more processors configured to cause a first job of the first subset to be executed using the first node and detect that the first job comprises one of a sequence of reoccurring jobs. The one or more processors configured to detect that a second job corresponding with a subsequent job of the reoccurring jobs should be added to the job queue for the first node prior to a next polling of candidate jobs for the first node and add the second job to the job queue for the first node in response to detection that the second job should be added to the job queue for the first node prior to the next polling of candidate jobs for the first node. The one or more processors configured to cause the second job to be executed using the first node and cause data generated by the second job to be stored using the first node.

One embodiment of the disclosed technology includes detecting that a first job queue length for a first job queue associated with a first node of a plurality of nodes is less than a queue length threshold, identifying a second node of the plurality of nodes, identifying a set of jobs assigned to a second job queue for the second node based on a difference between the first job queue length and the queue length threshold, adding the set of jobs to the first job queue for the first node, deleting the set of jobs from the second job queue for the second node, running a first job of the set of jobs on the first node, and storing data generated by the first job using the first node.

One embodiment of the disclosed technology includes a memory (e.g., a volatile or non-volatile memory) in communication with one or more processors. The memory configured to store a first job queue associated with a first node of a plurality of nodes. The one or more processors configured to detect that a first job queue length for the first job queue associated with the first node is less than a queue length threshold and identify a second node of the plurality of nodes in response to detection that the first job queue length is less than the queue length threshold. The one or more processors configured to identify a set of jobs assigned to a second job queue for the second node based on a difference between the first job queue length and the queue length threshold. The one or more processors configured to add the set of jobs to the first job queue for the first node and delete the set of jobs from the second job queue for the second node. The one or more processors configured to cause a first job of the set of jobs to be executed on the first node and data generated by the first job to be stored on the first node.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
    detecting that an age of a locally cached version of a job queue lengths table is greater than a threshold age;
    in response to detecting that the age of the locally cached version of the job queue lengths table is greater than the threshold age, acquiring a current version of the job queue lengths table;
    evaluating the current version of the job queue lengths table, wherein the current version of the job queue lengths table stores a queue length threshold for a plurality of nodes and a respective job queue length for each respective node and evaluating the current version comprises:
        detecting that a first job queue length for a first job queue in the current version of the job queue lengths table associated with a first node of the plurality of nodes is less than a first queue length threshold, the first queue length threshold comprising an upper queue length threshold and a lower queue length threshold; and
        identifying a second node of the plurality of nodes, the identifying including determining a second job queue length from the job queue lengths table for a second job queue and detecting that the second job queue length for the second job queue associated with the second node comprises a highest job queue length of any node within the plurality of nodes;
    identifying, by the first node in the plurality of nodes, a set of jobs assigned to the second job queue for the second node based on a difference between the second job queue length for the second node and the upper queue length threshold, the identifying the set of jobs assigned to the second job queue based on positions of the set of jobs within the second job queue for the second node;
    adding the set of jobs to the first job queue for the first node;
    deleting the set of jobs from the second job queue for the second node;
    based on the set of jobs added to the first job queue, running a first job of the set of jobs on the first node; and
    storing data generated by the first job using the first node.

2. The method of claim 1, wherein:
    the identifying the second node includes randomly identifying the second node in response to detecting that the first job queue length is less than the queue length threshold, and the identifying the set of jobs assigned to the second job queue is based on a priority status of the set of jobs.

3. The method of claim 1, wherein:
    the identifying the second node includes randomly identifying the second node among data storage nodes of the plurality of nodes that have job queue lengths greater than a second queue length threshold greater than the queue length threshold in response to detecting that the first job queue length is less than the queue length threshold.

4. The method of claim 1, wherein:
    the identifying the second node includes identifying the second node based on a second job queue length for the second job queue associated with the second node in response to detecting that the first job queue length is less than the queue length threshold.

5. The method of claim 4, further comprising:
    detecting that the second job queue length for the second job queue is greater than a second queue length threshold; and
    writing the second job queue length to the table of job queue lengths in response to detecting that the second job queue length is greater than the second queue length threshold.

6. The method of claim 1, wherein:
    the acquiring the current version of the job queue lengths table comprises acquiring the current version of the job queue lengths table from a distributed metadata store.

7. The method of claim 1, wherein:
    the identifying the set of jobs assigned to the second job queue for the second node includes identifying a user-triggered job in a queue position within the second job queue above the queue length threshold and assigning the user-triggered job to the set of jobs.

8. The method of claim 1, wherein:
    the set of jobs comprises a plurality of jobs equal to the difference between the first job queue length and the queue length threshold.

9. A data management system, comprising:
    a memory configured to store a first job queue associated with a first node of a plurality of nodes; and
    one or more processors configured to:
        detect that an age of a locally cached version of a job queue lengths table is greater than a threshold age;
        in response to detecting that the age of the locally cached version of the job queue lengths table is greater than the threshold age, acquiring a current version of the job queue lengths table;
        evaluate the current version of the job queue lengths table, wherein the current version of the job queue lengths table stores a queue length threshold for all a plurality of nodes and a respective job queue length for each respective node and evaluating the current version comprises:
            detecting that a first job queue length for the first job queue associated with the first node is less than a queue length threshold and identify a second node of the plurality of nodes in response to detection that the first job queue length is less than the queue length threshold, the queue length threshold comprising an upper queue length threshold and a lower queue length threshold; and
            identifying a second node of the plurality of nodes, the identifying including determining a second job queue length from the job queue lengths table for a second job queue and detecting that the second job queue length for the second job queue associated with the second node comprises a highest job queue length of any node within the plurality of nodes;
        identify, by the first node in the plurality of nodes, a set of jobs assigned to a second job queue for the second node based on a difference between the second job queue length for the second node and the upper queue length threshold, the identifying the set of jobs assigned to the second job queue based on positions of the set of jobs within the second job queue for the second node;

add the set of jobs to the first job queue for the first, node and delete the set of jobs from the second job queue for the second node;

based on the set of jobs identified by the first node added to the first job queue, running a first job of the set of jobs on the first node; and store data generated by the first job on the first node.

10. The data management system of claim 9, wherein:

the one or more processors configured to randomly identify the second node among the plurality of nodes in response to detection that the first job queue length is less than the queue length threshold, and the identifying the set of jobs assigned to the second job queue is based on a priority status of the set of jobs.

11. The data management system of claim 9, wherein:

the one or more processors configured to randomly identify the second node among data storage nodes of the plurality of nodes that have job queue lengths greater than a second queue length threshold greater than the queue length threshold in response to detection that the first job queue length is less than the queue length threshold.

12. The data management system of claim 9, wherein:

the one or more processors configured to identify the second node based on a second job queue length for the second job queue associated with the second node in response to detection that the first job queue length is less than the queue length threshold.

13. The data management system of claim 9, wherein:

the one or more processors configured to acquire the current version of the job queue lengths table from a distributed metadata store.

14. The data management system of claim 9, wherein:

the one or more processors configured to detect that the first job queue length for the first job queue is greater than a second queue length threshold and write the first job queue length to the table of job queue lengths in response to detection that the first job queue length is greater than the second queue length threshold.

15. The data management system of claim 9, wherein:

the one or more processors configured identify a user-triggered job in a queue position within the second job queue above the queue length threshold and assign the user-triggered job to the set of jobs.

16. One or more non-transitory storage devices containing processor readable code for programming one or more processors to perform a method for operating a data management system, the method comprising:

detecting that an age of a locally cached version of a job queue lengths table is greater than a threshold age;

in response to detecting that the age of the locally cached version of the job queue lengths table is greater than the threshold age, acquiring a current version of the job queue lengths table;

evaluating the current version of the job queue lengths table, wherein the current version of the job queue lengths table stores a queue length threshold for a plurality of nodes and a respective job queue length for each respective node and evaluating the current version comprises:

detecting that a first job queue length for a first job queue in the current version of the job queue lengths table associated with a first node of the plurality of nodes is less than a first queue length threshold, the first queue length threshold comprising an upper queue length threshold and a lower queue length threshold; and identifying, a second node of the plurality of nodes among data storage nodes of the plurality of nodes that have job queue lengths greater than a second queue length threshold greater than the queue length threshold, the identifying including determining a second job queue length from the job queue lengths table for a second job queue and detecting that the second job queue length for the second job queue associated with the second node comprises a highest job queue length of any node within the plurality of nodes;

identifying, by the first node in the plurality of nodes, a set of jobs assigned to the second job queue for the second node based on a difference between the second job queue length for the second node and the upper queue length threshold, the identifying the set of jobs assigned to the second job queue based on positions of the set of jobs within the second job queue for the second node;

adding the set of jobs to the first job queue for the first node;

deleting the set of jobs from the second job queue for the second node;

based on the set of jobs identified by the first node added to the first job queue, running a first job of the set of jobs on the first node; and storing data generated by the first job using the first node.

* * * * *